United States Patent
Matsumura et al.

(10) Patent No.: US 11,683,129 B2
(45) Date of Patent: Jun. 20, 2023

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/961,490

(22) PCT Filed: Jan. 12, 2018

(86) PCT No.: PCT/JP2018/000731
§ 371 (c)(1),
(2) Date: Jul. 10, 2020

(87) PCT Pub. No.: WO2019/138563
PCT Pub. Date: Jul. 18, 2019

(65) Prior Publication Data
US 2020/0389260 A1   Dec. 10, 2020

(51) Int. Cl.
*H04W 4/00* (2018.01)
*H04L 1/1812* (2023.01)
*H04W 76/27* (2018.01)
*H04L 5/00* (2006.01)
*H04W 74/08* (2009.01)
*H04W 72/21* (2023.01)

(52) U.S. Cl.
CPC .......... *H04L 1/1819* (2013.01); *H04L 5/0055* (2013.01); *H04L 5/0092* (2013.01); *H04W 72/21* (2023.01); *H04W 74/0833* (2013.01); *H04W 76/27* (2018.02)

(58) Field of Classification Search
CPC ................................. H04W 74/0833
See application file for complete search history.

(56) References Cited

U.S. PATENT DOCUMENTS

2020/0128588 A1* 4/2020 Xiong .................. H04B 7/0617
2020/0275437 A1* 8/2020 Shi ..................... H04W 72/0413
2020/0280985 A1* 9/2020 Ijaz ................... H04W 72/0413

FOREIGN PATENT DOCUMENTS

WO        2017/118627 A1    7/2017

OTHER PUBLICATIONS

Extended European Search Report issued in counterpart European Patent Application No. 18899494.1, dated Jul. 27, 2021 (8 pages).
Samsung; "Resource Allocation for PUCCH Transmissions"; 3GPP TSG RAN WG1 Meeting NR#3, R1-1715995 Nagoya, Japan, Sep. 18-21, 2017 (4 pages).

(Continued)

*Primary Examiner* — Bo Hui A Zhu
(74) *Attorney, Agent, or Firm* — Osha Bergman Watanabe & Burton LLC

(57) ABSTRACT

A user terminal, according to the present invention, has a transmission section that transmits uplink control information (UCI) by using an uplink control channel, before RRC (Radio Resource Control) connection is set up, and a control section that determines a resource for the uplink control channel for use for transmitting the UCI, based on a given field value in system information.

7 Claims, 22 Drawing Sheets

(56) References Cited

OTHER PUBLICATIONS

Motorola Mobility, Lenovo; "PUCCH resource allocation"; 3GPP TSG RAN WG1 #91, R1-1720926; Reno, USA, Nov. 27-Dec. 1, 2017 (10 pages).
International Search Report issued in Application No. PCT/JP2018/000731, dated Apr. 3, 2018 (3 pages).
Written Opinion issued in International Application No. PCT/JP2018/000731, dated Apr. 3, 2018 (3 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
3GPP TSG RAN WG1 Meeting 91; R1-1720380; "Resource allocation for NR PUCCH;" NEC; Nov. 27-Dec. 1, 2017; Reno, Nevada (9 pages).
Office Action issued in the counterpart Japanese Patent Application No. 2019-564256, dated Apr. 5, 2022 (6 pages).
Office Action issued in the counterpart Indian Patent Application No. 202037033024, dated Apr. 12, 2022 (7 pages).

\* cited by examiner

| | | PUCCH Format 0 | PUCCH Format 1 | PUCCH Format 2 | PUCCH Format 3 | PUCCH Format 4 |
|---|---|---|---|---|---|---|
| Starting symbol | Configurability | ✓ | ✓ | ✓ | ✓ | ✓ |
| | Value range | 0-13 | 0-10 | 0-13 | 0-10 | 0-10 |
| Number of symbols in a slot | Configurability | ✓ | ✓ | ✓ | ✓ | ✓ |
| | Value range | 1, 2 | 4-14 | 1, 2 | 4-14 | 4-14 |
| Index for identifying starting PRB | Configurability | ✓ | ✓ | ✓ | ✓ | ✓ |
| | Value range | 0-274 | 0-274 | 0-274 | 0-274 | 0-274 |
| Number of PRBs | Configurability | N.A. | N.A. | ✓ | ✓ | N.A. |
| | Value range | N.A. (Default is 1) | N.A. (Default is 1) | 1-16 | 1-6, 8-10, 12, 15, 16 | N.A. (Default is 1) |
| Enabling a frequency hopping | Configurability | ✓ | ✓ | ✓ | ✓ | ✓ |
| | Value range | On/Off (only for 2 symbol) | On/Off | On/Off (only for 2 symbol) | On/Off | On/Off |
| Frequency resource of 2nd hop if frequency Hopping is enabled | Configurability | ✓ | ✓ | ✓ | ✓ | ✓ |
| | Value range | 0-274 | 0-274 | 0-274 | 0-274 | 0-274 |
| Index of initial cyclic shift | Configurability | ✓ | ✓ | N.A. | N.A. | N.A. |
| | Value range | 0-11 | 0-11 | N.A. | N.A. | N.A. |
| Index of time-domain OCC | Configurability | N.A. | ✓ | N.A. | N.A. | N.A. |
| | Value range | N.A. | 0-6 | N.A. | N.A. | N.A. |
| Length of Pre-DFT OCC | Configurability | N.A. | N.A. | N.A. | N.A. | ✓ |
| | Value range | N.A. | N.A. | N.A. | N.A. | 2, 4 |
| Index of Pre-DFT OCC | Configurability | N.A. | N.A. | N.A. | N.A. | ✓ |
| | Value range | N.A. | N.A. | N.A. | N.A. | 0, 1, 2, 3 |

PARAMETER SET FOR PUCCH RESOURCE

FIG. 1

|  | | PUCCH Format 0 | PUCCH Format 1 |
|---|---|---|---|
| Starting symbol | Configurability | ✓ | ✓ |
|  | Value range | 0-13 | 0-10 |
| Number of symbols in a slot | Configurability | ✓ | ✓ |
|  | Value range | 1, 2 | 4, 14 |
| Index for identifying starting PRB | Configurability | ✓ | ✓ |
|  | Value range | $0, 10, N_{MAX}-11, N_{MAX}-1$ | $0, 10, N_{MAX}-11, N_{MAX}-1$ |
| Number of PRBs | Configurability | N.A. | N.A. |
|  | Value range | Always 1 | Always 1 |
| Enabling a frequency hopping | Configurability | N.A. | N.A. |
|  | Value range | Always On (for 2 symbol) | Always On |
| Frequency resource of 2$^{nd}$ hop if frequency Hopping is enabled | Configurability | ✓ | ✓ |
|  | Value range | $(N_1 + P) \bmod (N_{MAX})$ | $(N_1 + P) \bmod (N_{MAX})$ |
| Index of initial cyclic shift | Configurability | ✓ | ✓ |
|  | Value range | 0, 2, 4 | 0, 2, 4, 6, 8, 10 |
| Index of time-domain OCC | Configurability | N.A. | ✓ |
|  | Value range | N.A. | 0 - 6 |

PARAMETER SET FOR PUCCH RESOURCE

FIG. 2

| GIVEN FIELD VALUE IN DCI | PUCCH RESOURCE |
|---|---|
| 00 | PUCCH RESOURCE #0 |
| 01 | PUCCH RESOURCE #1 |
| 10 | PUCCH RESOURCE #2 |
| 11 | PUCCH RESOURCE #3 |

FIG. 3

| GIVEN FIELD VALUE IN DCI | IMPLICIT INDEX | PUCCH RESOURCE |
|---|---|---|
| 00 | 0 | PUCCH RESOURCE #0 |
| 00 | 1 | PUCCH RESOURCE #1 |
| 01 | 0 | PUCCH RESOURCE #2 |
| 01 | 1 | PUCCH RESOURCE #3 |
| 10 | 0 | PUCCH RESOURCE #4 |
| 10 | 1 | PUCCH RESOURCE #5 |
| 11 | 0 | PUCCH RESOURCE #6 |
| 11 | 1 | PUCCH RESOURCE #7 |

| INDEX | PUCCH RESOURCE |
|---|---|
| 0 | PUCCH RESOURCE #0 |
| 1 | PUCCH RESOURCE #1 |
| 2 | PUCCH RESOURCE #2 |
| 3 | PUCCH RESOURCE #3 |
| 4 | PUCCH RESOURCE #4 |
| 5 | PUCCH RESOURCE #5 |
| 6 | PUCCH RESOURCE #6 |
| 7 | PUCCH RESOURCE #7 |
| 8 | PUCCH RESOURCE #8 |
| 9 | PUCCH RESOURCE #9 |
| 10 | PUCCH RESOURCE #10 |
| 11 | PUCCH RESOURCE #11 |
| 12 | PUCCH RESOURCE #12 |
| 13 | PUCCH RESOURCE #13 |
| 14 | PUCCH RESOURCE #14 |
| 15 | PUCCH RESOURCE #15 | y=ONE BIT

PUCCH RESOURCE SET

FIG. 6B

| INDEX | PUCCH RESOURCE |
|---|---|
| 0 | PUCCH RESOURCE #0 |
| 1 | PUCCH RESOURCE #1 |
| 2 | PUCCH RESOURCE #2 |
| 3 | PUCCH RESOURCE #3 |
| 4 | PUCCH RESOURCE #4 |
| 5 | PUCCH RESOURCE #5 |
| 6 | PUCCH RESOURCE #6 |
| 7 | PUCCH RESOURCE #7 |
| 8 | PUCCH RESOURCE #8 |
| 9 | PUCCH RESOURCE #9 |
| 10 | PUCCH RESOURCE #10 |
| 11 | PUCCH RESOURCE #11 |
| 12 | PUCCH RESOURCE #12 |
| 13 | PUCCH RESOURCE #13 |
| 14 | PUCCH RESOURCE #14 |
| 15 | PUCCH RESOURCE #15 | y=TWO BITS

PUCCH RESOURCE SET

FIG. 7B

| INDEX | PUCCH RESOURCE |
|---|---|
| 0 | PUCCH RESOURCE #0 |
| 1 | PUCCH RESOURCE #1 |
| 2 | PUCCH RESOURCE #2 |
| 3 | PUCCH RESOURCE #3 |
| 4 | PUCCH RESOURCE #4 |
| 5 | PUCCH RESOURCE #5 |
| 6 | PUCCH RESOURCE #6 |
| 7 | PUCCH RESOURCE #7 |
| 8 | PUCCH RESOURCE #8 |
| 9 | PUCCH RESOURCE #9 |
| 10 | PUCCH RESOURCE #10 |
| 11 | PUCCH RESOURCE #11 |
| 12 | PUCCH RESOURCE #12 |
| 13 | PUCCH RESOURCE #13 |
| 14 | PUCCH RESOURCE #14 |
| 15 | PUCCH RESOURCE #15 | y=ONE BIT

PUCCH RESOURCE SET

FIG. 7A

| INDEX | PUCCH RESOURCE |
|---|---|
| 0 | PUCCH RESOURCE #0 |
| 1 | PUCCH RESOURCE #1 |
| 2 | PUCCH RESOURCE #2 |
| 3 | PUCCH RESOURCE #3 |
| 4 | PUCCH RESOURCE #4 |
| 5 | PUCCH RESOURCE #5 |
| 6 | PUCCH RESOURCE #6 |
| 7 | PUCCH RESOURCE #7 |
| 8 | PUCCH RESOURCE #8 |
| 9 | PUCCH RESOURCE #9 |
| 10 | PUCCH RESOURCE #10 |
| 11 | PUCCH RESOURCE #11 |
| 12 | PUCCH RESOURCE #12 |
| 13 | PUCCH RESOURCE #13 |
| 14 | PUCCH RESOURCE #14 |
| 15 | PUCCH RESOURCE #15 | y=ZERO BIT

PUCCH RESOURCE SET

| INDEX | PUCCH RESOURCE |
|---|---|
| 0 | PUCCH RESOURCE #0 (SHORT PUCCH) |
| 1 | PUCCH RESOURCE #1 (LONG PUCCH) |
| 2 | PUCCH RESOURCE #2 (SHORT PUCCH) |
| 3 | PUCCH RESOURCE #3 (LONG PUCCH) |
| 4 | PUCCH RESOURCE #4 (SHORT PUCCH) |
| 5 | PUCCH RESOURCE #5 (LONG PUCCH) |
| 6 | PUCCH RESOURCE #6 (SHORT PUCCH) |
| 7 | PUCCH RESOURCE #7 (LONG PUCCH) |
| 8 | PUCCH RESOURCE #8 (SHORT PUCCH) |
| 9 | PUCCH RESOURCE #9 (LONG PUCCH) |
| 10 | PUCCH RESOURCE #10 (SHORT PUCCH) |
| 11 | PUCCH RESOURCE #11 (LONG PUCCH) |
| 12 | PUCCH RESOURCE #12 (SHORT PUCCH) |
| 13 | PUCCH RESOURCE #13 (LONG PUCCH) |
| 14 | PUCCH RESOURCE #14 (SHORT PUCCH) |
| 15 | PUCCH RESOURCE #15 (LONG PUCCH) | y=TWO BITS

PUCCH RESOURCE SET

| INDEX | PUCCH RESOURCE |
|---|---|
| 0 | PUCCH RESOURCE #0 (SHORT PUCCH) |
| 1 | PUCCH RESOURCE #1 (SHORT PUCCH) |
| 2 | PUCCH RESOURCE #2 (SHORT PUCCH) |
| 3 | PUCCH RESOURCE #3 (LONG PUCCH) |
| 4 | PUCCH RESOURCE #4 (SHORT PUCCH) |
| 5 | PUCCH RESOURCE #5 (LONG PUCCH) |
| 6 | PUCCH RESOURCE #6 (SHORT PUCCH) |
| 7 | PUCCH RESOURCE #7 (LONG PUCCH) |
| 8 | PUCCH RESOURCE #8 (SHORT PUCCH) |
| 9 | PUCCH RESOURCE #9 (LONG PUCCH) |
| 10 | PUCCH RESOURCE #10 (SHORT PUCCH) |
| 11 | PUCCH RESOURCE #11 (LONG PUCCH) |
| 12 | PUCCH RESOURCE #12 (SHORT PUCCH) |
| 13 | PUCCH RESOURCE #13 (LONG PUCCH) |
| 14 | PUCCH RESOURCE #14 (LONG PUCCH) |
| 15 | PUCCH RESOURCE #15 (LONG PUCCH) | y = TWO BITS

FIG. 9B

| INDEX | PUCCH RESOURCE |
|---|---|
| 0 | PUCCH RESOURCE #0 (SHORT PUCCH) |
| 1 | PUCCH RESOURCE #1 (SHORT PUCCH) |
| 2 | PUCCH RESOURCE #2 (SHORT PUCCH) |
| 3 | PUCCH RESOURCE #3 (LONG PUCCH) |
| 4 | PUCCH RESOURCE #4 (SHORT PUCCH) |
| 5 | PUCCH RESOURCE #5 (LONG PUCCH) |
| 6 | PUCCH RESOURCE #6 (SHORT PUCCH) |
| 7 | PUCCH RESOURCE #7 (LONG PUCCH) |
| 8 | PUCCH RESOURCE #8 (SHORT PUCCH) |
| 9 | PUCCH RESOURCE #9 (LONG PUCCH) |
| 10 | PUCCH RESOURCE #10 (SHORT PUCCH) |
| 11 | PUCCH RESOURCE #11 (LONG PUCCH) |
| 12 | PUCCH RESOURCE #12 (SHORT PUCCH) |
| 13 | PUCCH RESOURCE #13 (LONG PUCCH) |
| 14 | PUCCH RESOURCE #14 (LONG PUCCH) |
| 15 | PUCCH RESOURCE #15 (LONG PUCCH) | y = TWO BITS

| INDEX | PUCCH RESOURCE SET | | | |
|---|---|---|---|---|
| | PUCCH RESOURCE | | | |
| 0 | PUCCH RESOURCE #0-a | PUCCH RESOURCE #0-b | PUCCH RESOURCE #0-c | PUCCH RESOURCE #0-d |
| 1 | PUCCH RESOURCE #1-a | PUCCH RESOURCE #1-b | PUCCH RESOURCE #1-c | PUCCH RESOURCE #1-d |
| 2 | PUCCH RESOURCE #2-a | PUCCH RESOURCE #2-b | PUCCH RESOURCE #2-c | PUCCH RESOURCE #2-d |
| 3 | PUCCH RESOURCE #3-a | PUCCH RESOURCE #3-b | PUCCH RESOURCE #3-c | PUCCH RESOURCE #3-d |
| 4 | PUCCH RESOURCE #4-a | PUCCH RESOURCE #4-b | PUCCH RESOURCE #4-c | PUCCH RESOURCE #4-d |
| 5 | PUCCH RESOURCE #5-a | PUCCH RESOURCE #5-b | PUCCH RESOURCE #5-c | PUCCH RESOURCE #5-d |
| 6 | PUCCH RESOURCE #6-a | PUCCH RESOURCE #6-b | PUCCH RESOURCE #6-c | PUCCH RESOURCE #6-d |
| 7 | PUCCH RESOURCE #7-a | PUCCH RESOURCE #7-b | PUCCH RESOURCE #7-c | PUCCH RESOURCE #7-d |
| 8 | PUCCH RESOURCE #8-a | PUCCH RESOURCE #8-b | PUCCH RESOURCE #8-c | PUCCH RESOURCE #8-d |
| 9 | PUCCH RESOURCE #9-a | PUCCH RESOURCE #9-b | PUCCH RESOURCE #9-c | PUCCH RESOURCE #9-d |
| 10 | PUCCH RESOURCE #10-a | PUCCH RESOURCE #10-b | PUCCH RESOURCE #10-c | PUCCH RESOURCE #10-d |
| 11 | PUCCH RESOURCE #11-a | PUCCH RESOURCE #11-b | PUCCH RESOURCE #11-c | PUCCH RESOURCE #11-d |
| 12 | PUCCH RESOURCE #12-a | PUCCH RESOURCE #12-b | PUCCH RESOURCE #12-c | PUCCH RESOURCE #12-d |
| 13 | PUCCH RESOURCE #13-a | PUCCH RESOURCE #13-b | PUCCH RESOURCE #13-c | PUCCH RESOURCE #13-d |
| 14 | PUCCH RESOURCE #14-a | PUCCH RESOURCE #14-b | PUCCH RESOURCE #14-c | PUCCH RESOURCE #14-d |
| 15 | PUCCH RESOURCE #15-a | PUCCH RESOURCE #15-b | PUCCH RESOURCE #15-c | PUCCH RESOURCE #15-d |

FIG. 12

| INDEX | PUCCH RESOURCE SET | | | |
|---|---|---|---|---|
| | PUCCH RESOURCE | | | |
| 0 | PUCCH RESOURCE #0-a (S) | PUCCH RESOURCE #0-b (L) | PUCCH RESOURCE #0-c (S) | PUCCH RESOURCE #0-d (L) |
| 1 | PUCCH RESOURCE #1-a (S) | PUCCH RESOURCE #1-b (L) | PUCCH RESOURCE #1-c (S) | PUCCH RESOURCE #1-d (L) |
| 2 | PUCCH RESOURCE #2-a (S) | PUCCH RESOURCE #2-b (L) | PUCCH RESOURCE #2-c (S) | PUCCH RESOURCE #2-d (L) |
| 3 | PUCCH RESOURCE #3-a (S) | PUCCH RESOURCE #3-b (L) | PUCCH RESOURCE #3-c (S) | PUCCH RESOURCE #3-d (L) |
| 4 | PUCCH RESOURCE #4-a (S) | PUCCH RESOURCE #4-b (L) | PUCCH RESOURCE #4-c (S) | PUCCH RESOURCE #4-d (L) |
| 5 | PUCCH RESOURCE #5-a (S) | PUCCH RESOURCE #5-b (L) | PUCCH RESOURCE #5-c (S) | PUCCH RESOURCE #5-d (L) |
| 6 | PUCCH RESOURCE #6-a (S) | PUCCH RESOURCE #6-b (L) | PUCCH RESOURCE #6-c (S) | PUCCH RESOURCE #6-d (L) |
| 7 | PUCCH RESOURCE #7-a (S) | PUCCH RESOURCE #7-b (L) | PUCCH RESOURCE #7-c (S) | PUCCH RESOURCE #7-d (L) |
| 8 | PUCCH RESOURCE #8-a (S) | PUCCH RESOURCE #8-b (L) | PUCCH RESOURCE #8-c (S) | PUCCH RESOURCE #8-d (L) |
| 9 | PUCCH RESOURCE #9-a (S) | PUCCH RESOURCE #9-b (L) | PUCCH RESOURCE #9-c (S) | PUCCH RESOURCE #9-d (L) |
| 10 | PUCCH RESOURCE #10-a (S) | PUCCH RESOURCE #10-b (L) | PUCCH RESOURCE #10-c (S) | PUCCH RESOURCE #10-d (L) |
| 11 | PUCCH RESOURCE #11-a (S) | PUCCH RESOURCE #11-b (L) | PUCCH RESOURCE #11-c (S) | PUCCH RESOURCE #11-d (L) |
| 12 | PUCCH RESOURCE #12-a (S) | PUCCH RESOURCE #12-b (L) | PUCCH RESOURCE #12-c (S) | PUCCH RESOURCE #12-d (L) |
| 13 | PUCCH RESOURCE #13-a (S) | PUCCH RESOURCE #13-b (L) | PUCCH RESOURCE #13-c (S) | PUCCH RESOURCE #13-d (L) |
| 14 | PUCCH RESOURCE #14-a (S) | PUCCH RESOURCE #14-b (L) | PUCCH RESOURCE #14-c (S) | PUCCH RESOURCE #14-d (L) |
| 15 | PUCCH RESOURCE #15-a (S) | PUCCH RESOURCE #15-b (L) | PUCCH RESOURCE #15-c (S) | PUCCH RESOURCE #15-d (L) |

FIG. 13

| INDEX | PUCCH RESOURCE SET | | | |
|---|---|---|---|---|
| | | PUCCH RESOURCE | | |
| 0 | PUCCH RESOURCE #0-a (S) | PUCCH RESOURCE #0-b (S) | PUCCH RESOURCE #0-c (S) | PUCCH RESOURCE #0-d (L) |
| 1 | PUCCH RESOURCE #1-a (S) | PUCCH RESOURCE #1-b (S) | PUCCH RESOURCE #1-c (S) | PUCCH RESOURCE #1-d (L) |
| 2 | PUCCH RESOURCE #2-a (S) | PUCCH RESOURCE #2-b (S) | PUCCH RESOURCE #2-c (S) | PUCCH RESOURCE #2-d (L) |
| 3 | PUCCH RESOURCE #3-a (S) | PUCCH RESOURCE #3-b (S) | PUCCH RESOURCE #3-c (S) | PUCCH RESOURCE #3-d (L) |
| 4 | PUCCH RESOURCE #4-a (S) | PUCCH RESOURCE #4-b (S) | PUCCH RESOURCE #4-c (S) | PUCCH RESOURCE #4-d (L) |
| 5 | PUCCH RESOURCE #5-a (S) | PUCCH RESOURCE #5-b (L) | PUCCH RESOURCE #5-c (S) | PUCCH RESOURCE #5-d (L) |
| 6 | PUCCH RESOURCE #6-a (S) | PUCCH RESOURCE #6-b (L) | PUCCH RESOURCE #6-c (S) | PUCCH RESOURCE #6-d (L) |
| 7 | PUCCH RESOURCE #7-a (S) | PUCCH RESOURCE #7-b (L) | PUCCH RESOURCE #7-c (S) | PUCCH RESOURCE #7-d (L) |
| 8 | PUCCH RESOURCE #8-a (S) | PUCCH RESOURCE #8-b (L) | PUCCH RESOURCE #8-c (S) | PUCCH RESOURCE #8-d (L) |
| 9 | PUCCH RESOURCE #9-a (S) | PUCCH RESOURCE #9-b (L) | PUCCH RESOURCE #9-c (S) | PUCCH RESOURCE #9-d (L) |
| 10 | PUCCH RESOURCE #10-a (S) | PUCCH RESOURCE #10-b (L) | PUCCH RESOURCE #10-c (S) | PUCCH RESOURCE #10-d (L) |
| 11 | PUCCH RESOURCE #11-a (S) | PUCCH RESOURCE #11-b (L) | PUCCH RESOURCE #11-c (S) | PUCCH RESOURCE #11-d (L) |
| 12 | PUCCH RESOURCE #12-a (S) | PUCCH RESOURCE #12-b (L) | PUCCH RESOURCE #12-c (L) | PUCCH RESOURCE #12-d (L) |
| 13 | PUCCH RESOURCE #13-a (S) | PUCCH RESOURCE #13-b (L) | PUCCH RESOURCE #13-c (L) | PUCCH RESOURCE #13-d (L) |
| 14 | PUCCH RESOURCE #14-a (S) | PUCCH RESOURCE #14-b (L) | PUCCH RESOURCE #14-c (L) | PUCCH RESOURCE #14-d (L) |
| 15 | PUCCH RESOURCE #15-a (S) | PUCCH RESOURCE #15-b (L) | PUCCH RESOURCE #15-c (L) | PUCCH RESOURCE #15-d (L) |
| | PUCCH RESOURCE SET | | | |

| INDEX | NUMBER OF SLOTS FROM MESSAGE 4 |
|---|---|
| 0 | 0 |
| 1 | 1 |
| 2 | 4 |
| 3 | 8 |

FIG. 15B

| INDEX | NUMBER OF SLOTS FROM MESSAGE 4 |
|---|---|
| 0 | 0 |
| 1 | 1 |
| 2 | 2 |
| 3 | 3 |

FIG. 15C

| INDEX | NUMBER OF SLOTS FROM MESSAGE 4 |
|---|---|
| 0 | 0 |
| 1 | 1 |
| 2 | 4 |
| 3 | 8 |

FIG. 15D

| PCCCH FORMAT | SLOTS FROM MESSAGE 4 |
|---|---|
| SHORT PUCCH | 0 |
| LONG PUCCH | 4 |

| | | PUCCH Format 0 | PUCCH Format 1 |
|---|---|---|---|
| Starting symbol | Configurability | √ | √ |
| | Value range | 0-13 | 0-10 |
| Number of symbols in a slot | Configurability | √ | √ |
| | Value range | 1, 2 | 4, 14 |
| Index for identifying starting PRB | Configurability | No | No |
| | Value range | $X_1$ | $X_2$ |
| Number of PRBs | Configurability | N.A. | N.A. |
| | Value range | Always 1 | Always 1 |
| Enabling a frequency hopping | Configurability | N.A | N.A |
| | Value range | Always On (for 2 symbol) | Always On |
| Frequency resource of 2$^{nd}$ hop if frequency Hopping is enabled | Configurability | No | No |
| | Value range | $N_{MAX} - X_1 - 1$ | $N_{MAX} - X_2 - 1$ |
| Index of initial cyclic shift | Configurability | √ | √ |
| | Value range | 0, 2, 4 | 0, 2, 4, 6, 8, 10 |
| Index of time-domain OCC | Configurability | N.A. | √ |
| | Value range | N.A. | 0 - 6 |

PARAMETER SET FOR PUCCH RESOURCE

FIG. 22

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE (referred to as, for example, "LTE-A (LTE-Advanced)," "FRA (Future Radio Access)," "4G," "5G," "5G+ (plus)," "NR (New RAT)," "LTE Rel. 14," "LTE Rel. 15 (or later versions)," etc.) are also under study for the purpose of achieving further broadbandization and increased speed beyond LTE.

In existing LTE systems (for example, LTE Rel. 8 to 13), downlink (DL) and/or uplink (UL) communication are carried out using 1-ms subframes (also referred to as "transmission time intervals (TTIs)" and so on). These subframes are the time unit for transmitting one channel-encoded data packet, and serve as the unit of processing in, for example, scheduling, link adaptation, retransmission control (HARQ (Hybrid Automatic Repeat reQuest)) and so on.

Also, in existing LTE systems (for example, LTE Rel. 8 to 13), a user terminal transmits uplink control information (UCI) by using an uplink control channel (for example, PUCCH (Physical Uplink Control CHannel)) or an uplink shared channel (for example, PUSCH (Physical Uplink Shared CHannel)). The format of this uplink control channel is referred to as "PUCCH format," and so on.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, LTE Rel. 15 or later version, 5G, 5G+, NR, etc.), studies are underway to determine resources (for example, PUCCH resource) for an uplink control channel (for example, PUCCH) based on RRC signaling and downlink control information (DCI), when UCI is transmitted using the uplink control channel after RRC (Radio Resource Control) connection is set up.

Meanwhile, in these future radio communication systems, UCI (for example, HARQ-ACK in response to message 4 in random access procedures, which will be described later) may be transmitted using an uplink control channel before RRC connection is set up. However, before RRC connection is set up, RRC signaling-based reporting is not possible.

Consequently, when UCI is transmitted using an uplink control channel before RRC connection is set up, the problem lies in how a user terminal should determine resources for the uplink control channel.

The present invention has been made in view of the above, and it is therefore an object of the present invention to provide a user terminal and a radio communication method, whereby resources for an uplink control channel for use for transmitting UCI before RRC connection is set up can be determined properly.

Solution to Problem

According to one aspect of the present invention, a user terminal has a transmission section that transmits uplink control information (UCI) by using an uplink control channel, before RRC (Radio Resource Control) connection is set up, and a control section that determines a resource for the uplink control channel for use for transmitting the UCI, based on a given field value in system information.

Advantageous Effects of Invention

According to the present invention, resources for an uplink control channel for use for transmitting UCI before RRC connection is set up can be determined properly.

BRIEF DESCRIPTION OF DRAWINGS

FIG. 1 is a diagram to show examples of a parameter set for PUCCH resources and ranges of values that each parameter may assume;

FIG. 2 is a diagram to show other examples of a parameter set for PUCCH resources and ranges of values that each parameter may assume;

FIG. 3 is a diagram to show an example of how to specify PUCCH resources, according to a first example of the present invention;

FIG. 4 is a diagram to show another example of how to specify PUCCH resources, according to the first example;

FIGS. 6A and 6B provide diagrams that each show a second example of how to determine a PUCCH resource set, according to the second example;

FIGS. 7A and 7B provide diagrams that each show a third example of how to determine a PUCCH resource set, according to the second example;

FIG. 8 is a diagram to show a fourth example of how to determine a PUCCH resource set, according to the second example;

FIG. 9 provide diagrams that each show a fifth example of how to determine a PUCCH resource set, according to the second example;

FIG. 12 is a diagram to show a second example of how to determine a PUCCH resource set, according to the third example;

FIG. 13 is a diagram to show a third example of how to determine a PUCCH resource set, according to the third example;

FIG. 14 is a diagram to show a fourth example of how to determine a PUCCH resource set, according to the third example;

FIGS. 15A to 15D provide diagrams that each show an example of a table for use for determining the timing for transmitting UCI, according to a sixth example of the present invention;

FIG. 22 is a diagram to show other examples of a parameter set for PUCCH resources and ranges of values that each parameter may assume.

DESCRIPTION OF EMBODIMENTS

Figure 5:
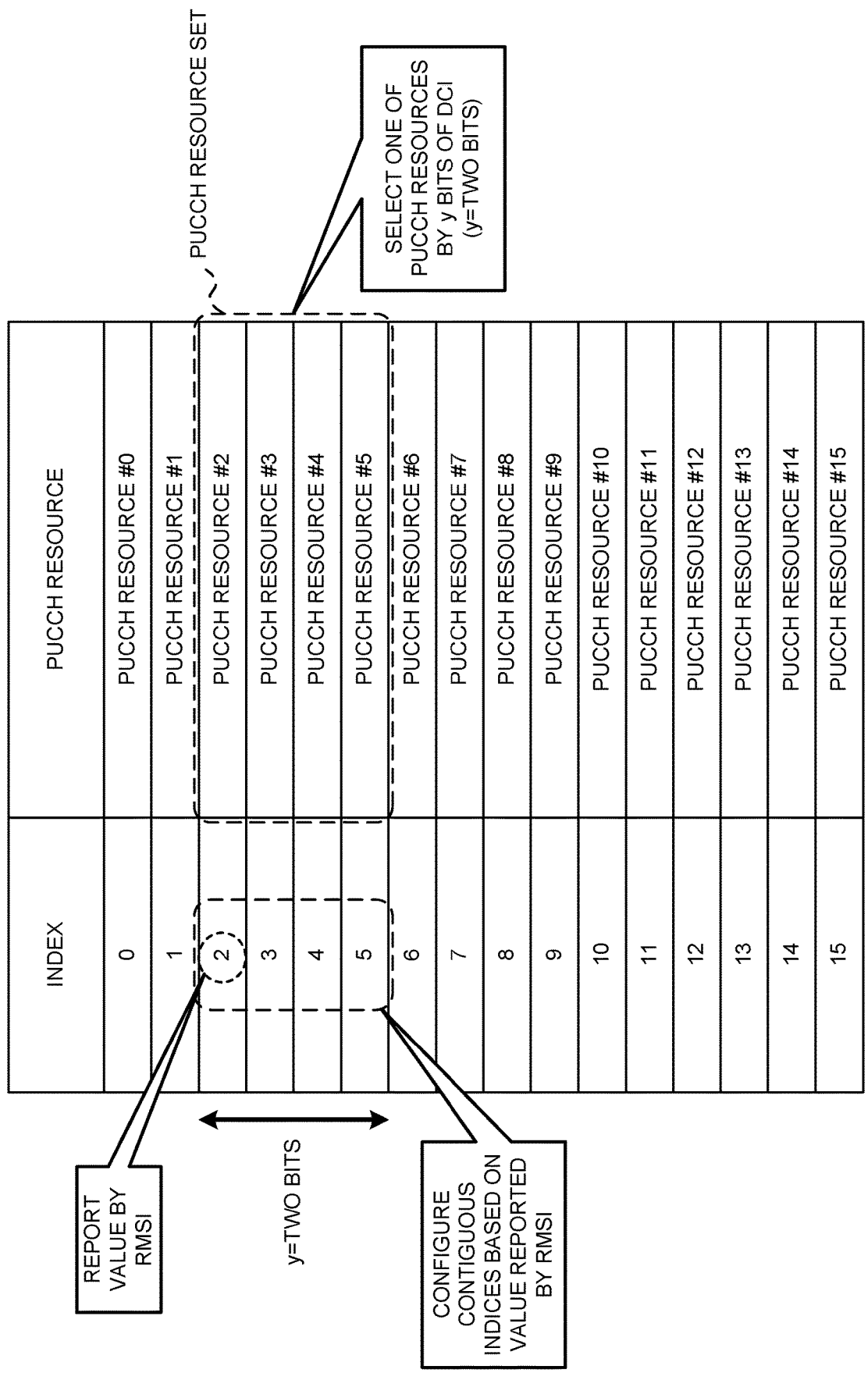
FIG. 5 is a diagram to show a first example of how to determine a PUCCH resource set, according to a second example of the present invention.

Envisaging future radio communication systems (for example, LTE Rel. 15 and later versions, 5G, NR, etc.), formats for an uplink control channel (for example, PUCCH) for use for transmitting UCI (also referred to as "PUCCH formats (PFs)," and/or the like) are under study.

Resources (for example, PUCCH resources) for use for transmitting this uplink control channel are defined per PUCCH format. For example, the allocation of PUCCH resources after RRC (Radio Resource Control) connection is set up is performed by using RRC signaling and downlink control information (DCI).

To be more specific, after RRC connection is set up, a set of a number of PUCCH resources (PUCCH resource set) is reported (configured) from a radio base station to a user terminal via RRC signaling. One of the PUCCH resources is specified by a given field value in DCI. The user terminal transmits a PUCCH using the PUCCH resource indicated by the given field value in DCI.

FIG. 1 is a diagram to show examples of a parameter set for PUCCH resources and ranges of values that each parameter may assume. As shown in FIG. 1, the parameter set for PUCCH resources may include at least one of the following parameters (also referred to as "fields," "information," and/or the like):

The symbol where the PUCCH starts being allocated (the starting symbol);

The number of symbols allocated to the PUCCH in a slot (the duration allocated to the PUCCH);

The index of the resource block (physical resource block (PRB)) where the PUCCH starts being allocated;

The number of PRBs allocated to the PUCCH;

Whether or not to enable frequency hopping for the PUCCH;

The frequency resource of the second hop and the index of the initial cyclic shift (CS) when frequency hopping is enabled;

The index of the orthogonal spreading code (for example, OCC (Orthogonal Cover Code)) in the time domain, and the length of the OCC (also referred to as "OCC length," "spreading factor," etc.) for use for block-wise spreading before the discrete Fourier transform (DFT); and The index of the OCC for use in block-wise spreading after the DFT.

Also, as shown in FIG. 1, the range of values that each parameter can take may be defined, per PUCCH format. Every PUCCH resource in the PUCCH resource set configured for the user terminal includes at least one parameter in the above parameter set, and each parameter may assume values within the range defined for the PUCCH format that applies.

Here, PUCCH formats (PFs) 0 and 1 shown in FIG. 1 are PFs for use for transmitting UCI of up to two bits (for example, delivery acknowledgment information (also referred to as "HARQ-ACK (Hybrid Automatic Repeat reQuest-ACKnowledgment)," "ACK or NACK," etc.)). PF 0 can be allocated to one or two symbols, and therefore is also referred to as "short PUCCH," "sequence-based short PUCCH" and the like. Meanwhile, PF 1 can be allocated to four to fourteen symbols, and therefore, is also referred to as "long PUCCH" and the like. In PF 1, a number of user terminals may be code-division-multiplexed (CDM) in the same PRB, by way of time-domain block-wise spreading using at least one of CS and OCC.

PUCCH formats (PFs) 2 to 4 are PFs for use for transmitting UCI of more than two bits (for example, channel state information (CSI) (or CSI and an HARQ-ACK and/or a scheduling request) (SR)). PF 2 can be allocated to one or two symbols, and therefore is also referred to as "short PUCCH" or the like. Meanwhile, PFs 3 and 4 can be allocated to four to fourteen symbols, and therefore are also referred to as "long PUCCH" and the like. In PF 3, a number of user terminals may be code-division-multiplexed (CDM) by using pre-DFT (frequency-domain) block-wise spreading.

As described above, after RRC connection is set up, a PUCCH resource set to include a number of PUCCH resources can be configured by RRC signaling, on a semi-static basis, and one of the PUCCH resources can be specified by DCI.

Now, before RRC connection is set up, random access procedures are executed between a user terminal and a radio base station. The random access procedures are performed, for example, in the following procedures.

(1) The user terminal transmits a preamble (also referred to as "random access preamble," "random access channel (PRACH (Physical Random Access CHannel))," etc.).

(2) Upon detecting the preamble, the radio base station transmits a random access response (also referred to as "RAR," "message 2," etc.).

(3) The user terminal establishes uplink synchronization based on a timing advance (TA) included in message 2, and transmits a higher layer (L2/L3) control message (message 3) by using a PUSCH. This control message includes the user terminal's identifier (for example, C-RNTI (Cell-Radio Network Temporary Identifier)).

(4) In response to the higher layer control message, the radio base station transmits a contention resolution message (message 4) by using a PDSCH.

(5) The user terminal transmits an HARQ-ACK to the radio base station, in response to this message 4, by using a PUCCH.

In this way, before RRC connection is set up, an HARQ-ACK for message 4 may be transmitted using a PUCCH. However, RRC signaling-based reporting is not possible before RRC connection is set up, and therefore the problem is how to specify the PUCCH resource to use to transmit the HARQ-ACK in response to message 4.

So, the present inventors have worked on a method for properly specifying PUCCH resources for use for transmitting UCI (for example, an HARQ-ACK in response to message 4) before RRC connection is set up, and arrived at the present invention.

Now, the present embodiment will be described below in detail. Note that, according to the present embodiment, although an HARQ-ACK in response to message 4 will be assumed as UCI to use before RRC connection is set up, this UCI may be any information that is transmitted by using a PUCCH before RRC connection is set up. Furthermore, although PUCCH formats 0 to 4 having been described with reference to FIG. 1 will be exemplified below, the names of PFs are not limited to these, and the names and formats may be changed as appropriate.

With the present embodiment, for example, the parameter set exemplified in FIG. 1 may be used for PUCCH resources. Each parameter in this parameter set can be set in values within the range defined for each PUCCH format (for example, PFs 0 to 4) in FIG. 1.

Alternatively, with the present embodiment, a parameter set to include a smaller number (a smaller number of types) of parameters than the parameter set exemplified in FIG. 1 may be used for PUCCH resources. FIG. 2 is a diagram to show other examples of a parameter set for PUCCH resources and ranges of values that each parameter may assume.

Since the UCI before RRC connection is set up is, for example, an HARQ-ACK, PUCCH formats (PFs 0 and 1) that can communicate UCI of up to two bits may be assumed. Therefore, the parameter set shown in FIG. 2 does not include parameters that are needed to transmit either of PFs 2 to 4 (for example, pre-DFT OCC length, pre-DFT OCC index, etc.), not including parameters that are needed to transmit at least one of PF 0 and PF 1.

Furthermore, the ranges of values that each parameter may assume, shown in FIG. 2, may also be configured for PUCCH formats that are more limited than in FIG. 1. For example, FIG. 2 shows the range of values that each parameter may assume, with respect to PF 0 and PF 1.

Furthermore, the ranges of values that each parameter may assume, shown in FIG. 2, may be more limited than in FIG. 1. For example, the number of symbols where the PUCCH is allocated in a slot may be limited to four or fourteen for PF 1. Also, the values of the starting index of the PRBs to allocate to the PUCCH may be limited to 0, 10, $N_{MAX}$-11, and $N_{MAX}$-1. Here, $N_{MAX}$ may be the maximum number of PRBs to constitute a BWP for uplink communication (UL BWP (Uplink Bandwidth Part)) activated for initial access (initial active UL BWP), a UL BWP, or a BWP configured for a user terminal (UE BWP).

Here, a BWP (BandWidth Part) is a partial frequency band that is configured in a carrier (component carrier (CC), cell, etc.), and is also referred to as a "partial band," a "bandwidth part," and so forth. One or more BWPs (including BWPs for downlink communication (DL BWPs) and/or UL BWPs) are configured for a user terminal, and at least one BWP is activated. Furthermore, one or more UL BWPs may be defined in advance in the specification, for initial access of a user terminal, and at least one UL BWP may be activated.

Also, the frequency resource of a second hop when frequency hopping is enabled may be selected from candidate values, which are indicated by at least one of the index (Ni) of the starting PRB, a given value (P), and system information (for example, at least one of RMSI (Remaining Minimum System Information), OSI (Other System Information), MIB (Master Information Block), and SIB (System Information Block)).

Also, the index of the initial CS may be limited to given values. For example, by limiting the index of the initial CS for PF 0 to 0, 2 or 4, the CS distance between a number of user terminals can be maximized. For example, in the event one bit is used, the CS distance can be maximized among UEs #0 to #3 by configuring UE #0={0, 6}, UE #1={2, 8} and UE #2={4, 10}. In the event of two bits, UEs #0 to #3 can be prevented from collisions by configuring UE #0={0, 3, 6, 9}, UE #1={2, 5, 8, 11} and UE #2={4, 7, 10, 1}.

Note that the given value (P) shown in FIG. 2 may be a cell-specific value. Alternatively, the given value (P) may be a value determined based on the initial active UL BWP (or its size).

For example, a table to associate between initial active UL BWPs (or their sizes) and given values (P) may be provided, so that the user terminal may determine frequency resource of the second hop when the above frequency hopping is enabled, by using the given values (P) that corresponds to the initial active UL BWP (or its size). In this table, for example, the given values P corresponding to initial active UL BWPs #1, #2, #3, and #4 may be determined 10, 20, 30, and 40, respectively.

Also, the value of the starting index of the PRBs to allocate to the PUCCH in FIG. 2 may be determined by taking into account the given value (P). For example, in FIG. 2, the range of values that the starting index may assume in PF 0 may be defined as "0, P, $N_{MAX}$-P-1, $N_{MAX}$-1." A similar range may be applied to PF 1.

Also, as shown in FIG. 22, the user terminal may assume that the pair of PRB indices (PRB numbers) for the first hop and the second hop is defined for each PUCCH format (PF). Since the required quality (for example, SNR (Signal to Noise Ratio)) varies between PF 0 and PF 1, the use of code-division-multiplexing (CDM) might lead to a deterioration of the quality of communication. Meanwhile, different PRB indices are defined for every PF, so that PF 0 and PF 1 can be frequency-division-multiplexed (FDM).

Note that in FIG. 22, the index of the starting PRB allocated to the PUCCH is defined as $X_1$, but may be defined as $X_1=X_2+1$ or $X_1=X_2-1$, or may be defined to be other values. By this means, the PUCCH resources for initial access can be limited to part of the PRBs, so that it is possible to provide frequency resources for other uses (for example, for at least one of UL data, DL data, a UL control channel and a DL control channel).

Note that given values $X_1$ and $X_2$ in FIG. 22 may be defined in the specification. Alternatively, these given values $X_1$ and $X_2$ may be selected from one or more candidate values, based on a given field value in broadcast information.

With the present embodiment, a user terminal specifies the PUCCH resource for use for transmitting UCI (for example, an HARQ-ACK in response to message 4, which has been described above) before RRC connection is set up, based on a given field value in system information (for example, RMSI). In the following description, RMSI will be described as an example, but information that can be acquired before RRC connection is set up (for example, other system information such as OSI, MIB, SIB and other higher layer control information) may replace RMSI.

With the present embodiment, a given number of PUCCH resources may be defined in advance. For example, if a given field in RMSI is comprised of x bits, $2^x$ types of PUCCH resources may each include, for example, at least one parameter in the parameter set exemplified in FIG. 1 or FIG. 2, and each parameter's value may be specified within the ranges exemplified in FIG. 1 or FIG. 2. The given number of PUCCH resources may be defined in advance in the specification, or may be derived based on broadcast information or the like.

First Example

In a first example of the present invention, a PUCCH resource set to include one or more PUCCH resources is reported to (configured in) a user terminal by a given field value of RMSI. Based on a given field value in DCI, the user terminal determines one PUCCH resource in the PUCCH resource set configured using the RMSI, and transmits UCI by using the determined PUCCH resource.

The DCI may be, for example, DCI to schedule message 4 or message 2, which has been described above.

FIG. 3 is a diagram to show examples of how to specify PUCCH resources, according to the first example. In FIG. 3, PUCCH resources #0 to #3 are configured in a user terminal by using RMSI. As shown in FIG. 3, each given field value in DCI may indicate one of PUCCH resources #0 to #3, configured using RMSI.

In FIG. 3, the user terminal determines one of PUCCH resources #0 to #3, configured using RMSI, based on a given field value in DCI, and transmits UCI by using the determined PUCCH resource.

FIG. 4 is a diagram to show other examples of how to specify PUCCH resources, according to the first example. In FIG. 4, PUCCH resources #0 to #7 are configured in a user terminal by using RMSI. As shown in FIG. 4, each given field value in DCI is associated with a number of PUCCH resources in a PUCCH resource set, configured using RMSI.

In FIG. 4, the user terminal determines one of PUCCH resources #0 to #3, configured using RMSI, based on given field values in DCI and implicit index values, and transmits UCI by using the determined PUCCH resource.

The user terminal may derive an implicit index value based on, for example, at least one of a control channel element (CCE), the user terminal's identifier (UE-ID, and, for example, RNTI), and the number of PRBs to allocate to the PDSCH that transmits message 2 or 4, which has been described above.

As shown in FIG. 4, if each given field value in DCI is associated with X (X>1, and X=2 here) implicit index values, the user terminal can derive the implicit indices by using, for example, the following equations:

Implicit index=CCE index mod($X$)

Implicit index=UE-ID mod($X$)

Implicit index=the number of PRBs allocated to message 2 or 4 mod($X$)

In FIG. 4, among PUCCH resources #0 to #3 configured using RMSI, the user terminal transmits UCI by using PUCCH resources indicated by given field values in DCI.

Note that the PUCCH resources in the PUCCH resource set configured by RMSI may be limited based on given rules (for example, the PFs and/or the ranges may be limited as shown in FIG. 2, a given number of PUCCH resources may be defined in advance, and so on).

Second Example

In the second example, a given field value in RMSI may indicate a single PUCCH resource, among a given number of PUCCH resources determined in advance. A user terminal may determine the PUCCH resource set based on the PUCCH resource (or the index of the PUCCH resource) a given field value of RMSI indicates.

The user terminal determines one PUCCH resource in the PUCCH resource set based on a given field value in DCI, and transmits UCI by using the determined PUCCH resource.

FIG. 5 is a diagram to show the first example of how to determine a PUCCH resource set, according to the second example. In FIG. 5, a given number of PUCCH resources (here, sixteen types of PUCCH resources #0 to #15) are defined in advance in the specification. In FIG. 5, one index is assigned (associated, linked, etc.) to one PUCCH resource. The given field values in RMSI may indicate indices that are associated with PUCCH resources.

For example, in FIG. 5, a given field value of RMSI indicates an index "2," which is associated with PUCCH resource #2. The user terminal determines the PUCCH resource set based on this index. As shown in FIG. 5, the user terminal may determine a PUCCH resource set to include PUCCH resources #2 to #5, with $2^y$ indices that are contiguous from the index "2." Here, y is the number of bits of the given field in DCI.

Based on given rules, the user terminal may associate each given field value in DCI with a PUCCH resource in the PUCCH resource set. For example, in FIG. 5, the given field values "00," "01," "10," and "11" in DCI may be associated with PUCCH resources #2, #3, #4, and #5 in the PUCCH resource set, respectively.

The user terminal may determine the PUCCH resources associated with (indicated by) the given field values in the DCI (which is, for example, DCI to schedule message 2 or 4), and transmit UCI by using the PUCCH resources determined.

Note that the user terminal may determine one PUCCH resource in a PUCCH resource set that is determined based on a given field value in RMSI, without using the above-described given field values in DCI, but instead by using y-bit implicit indices. The implicit index values may be derived based on, for example, at least one of a CCE, a UE-ID, and the number of PRBs allocated to message 2 or 4, which has been described above.

For example, the user terminal can derive the implicit indices by using the following equation:

Implicit index=CCE index mod($2^y$)

Implicit index=UE-ID mod($2^y$)

Implicit index=the number of PRBs allocated to message 2 or 4 mod($2^y$)

Furthermore, the user terminal may determine one PUCCH resource in a PUCCH resource set that is determined based on a given field value in RMSI, by using the above-described given field values in DCI and the implicit indices. For example, some of the parameters in the parameter set shown in FIG. 2 (for example, at least one of the starting index of PRBs, the index of the initial CS and the index of time-domain OCC) may be explicitly specified (may be part of the PUCCH resources specified). The rest of the parameters may be derived implicitly.

FIG. 6 are diagrams to show second examples of how to determine a PUCCH resource set, according to the second example. In FIG. 6, similar to FIG. 5, a given field value of RMSI indicates an index associated with one of PUCCH resources #0 to #15, defined in advance in the specification (here, index "2" associated with PUCCH resource #2).

As shown in FIGS. 6A and 6B, the number of PUCCH resources in the PUCCH resource set determined based on the given field value of RMSI is determined based on the number y of bits of the given field in DCI. For example, the number of the PUCCH resources may be $2^y$.

The number y of bits of the given field in DCI may vary depending on DCI format. For example, in the event DCI (also referred to as "fallback DCI" and so on) is allocated to a search space that is common to one or more user terminals (common search space), the above number of bits may be y=1. Also, in the event DCI is allocated to a user terminal-specific search space (also referred to as "non-fallback DCI" and so on), the above number of bits may be y=2. Therefore, the UE, when receiving fallback DCI, may refer to the applicable one bit of the fallback DCI, and, when receiving non-fallback DCI, may refer to the applicable two bits of the non-fallback DCI, and determine the PUCCH resource set. The number of bits above may assume other values.

For example, as shown in FIG. 6A, when the given field in the DCI is one bit, the user terminal may determine a PUCCH resource set that includes two PUCCH resources #2 and #3, based on PUCCH resource #2 indicated by the given field value of RMSI. In FIG. 6A, the DCI-induced overhead can be reduced.

For example, as shown in FIG. 6B, when the given field in the DCI is two bits, the user terminal may determine a PUCCH resource set that includes four PUCCH resources #2 to #5, based on PUCCH resource #2 indicated by the given field value of RMSI. In FIG. 6B, more types of PUCCH resources can be specified dynamically than in FIG. 6A, so that an effect of improving performance can be achieved.

FIG. 7 are diagrams to show third examples of how to determine a PUCCH resource set according to the second example. In FIG. 7, similar to FIG. 5 and FIG. 6, a given field value of RMSI indicates an index associated with one of PUCCH resources #0 to #15, defined in advance in the specification (here, index "2" associated with PUCCH resource #2).

As shown in FIG. 7A, the number of bits of the above-described field in DCI may be y=0. In this case, the user terminal may determine a PUCCH resource set that includes one PUCCH resource #2 indicated by the given field value of RMSI.

As shown in FIG. 7A, DCI in which the above given field value is y (y=0) bits (that is, DCI not including the above given field value) may be DCI to be allocated to a common search space (fallback DCI). Meanwhile, as shown in FIG. 7B, DCI in which the above given field value is y (y=1) bits may be DCI to be allocated to a user terminal-specific search space (non-fallback DCI). Therefore, the UE, when receiving fallback DCI, may not refer to the bit of the fallback DCI, and, when receiving non-fallback DCI, may refer to the applicable one bit of the non-fallback DCI, and determine the PUCCH resource set. The number of bits above may assume other values.

FIG. 8 is a diagram to show a fourth example of determining PUCCH resources according to the second example. As shown in FIG. 8, PUCCH resources #0 to #15 defined in advance in the specification may be comprised of PUCCH resources for short PUCCH (for example, PF 0) and PUCCH resources for long PUCCH (for example, PF 1).

For example, in FIG. 8, PUCCH resources for short PUCCH and PUCCH resources for long PUCCH have neighboring index values. By this means, if the given field in DCI is y (y≥1) bits, PUCCH resources that are determined based on the given field value of RMSI include, equally, PUCCH resources for short PUCCH (in FIG. 8, PUCCH resources #2 and #4) and PUCCH resources for long PUCCH (in FIG. 8, PUCCH resources #3 and #5).

Accordingly, whether the given field value in RMSI indicates short PUCCH or long PUCCH, the given field value in DCI can specify short PUCCH or long PUCCH.

FIG. 9 provide diagrams that each show a fifth example of how to determine a PUCCH resource set according to the second example. FIGS. 9A and 9B are different from FIG. 8 in that PUCCH resources #0 to #15, which are defined in the specification in advance, include, unevenly, PUCCH resources for short PUCCH (for example, PF 0) and PUCCH resources for long PUCCH (for example, PF 1).

For example, in FIGS. 9A and 9B, more PUCCH resources for short PUCCH are allocated to PUCCH resources having smaller index values, and more PUCCH resources for long PUCCH are allocated to PUCCH resources having smaller index values.

In FIGS. 9A and 9B, the given field value of RMSI is subject to control, so that it is possible to control the number of PUCCH resources for short PUCCH and PUCCH resources for long PUCCH included in a PUCCH resource set.

For example, in FIG. 9A, the given field value of RMSI is set to "0," so that the user terminal can determine a PUCCH resource set that includes three PUCCH resources #0 to #2 for short PUCCH and one PUCCH resource #3 for long PUCCH.

Meanwhile, in FIG. 9B, the given field value of RMSI is set to "12," so that the user terminal can determine a PUCCH resource set that includes one PUCCH resource #12 for short PUCCH and three PUCCH resources #13 to #15 for long PUCCH.

However, the diagrams to show the fifth example of how to determine a PUCCH resource set according to the second example shown in FIGS. 9A and 9B are not limited to these. For example, index 3 in FIGS. 9A and 9B may be short PUCCH, and index 12 may be long PUCCH. By this means, short PUCCH can always be allocated in a specific cell, and, furthermore, long PUCCH can always be allocated in a specific cell.

Assuming a cell where the coverage is relatively small (small cell), the cell may be designed so as to allow all UEs to establish connections using short PUCCH, so that, by making the contents of the PUCCH resource set all short PUCCHs, resources for short PUCCH can be allocated to the UE from more candidates, and the communication quality of PUCCH can be improved.

Also, assuming a cell where the coverage is larger than that of a small cell (large cell), the cell may be designed on the assumption that the majority of UEs establish connections by using long PUCCH, so that, by making the contents of the PUCCH resource set all long PUCCHs, resources for long PUCCH can be allocated to UEs from more candidates, and the communication quality of PUCCH can be improved.

Figure 10:
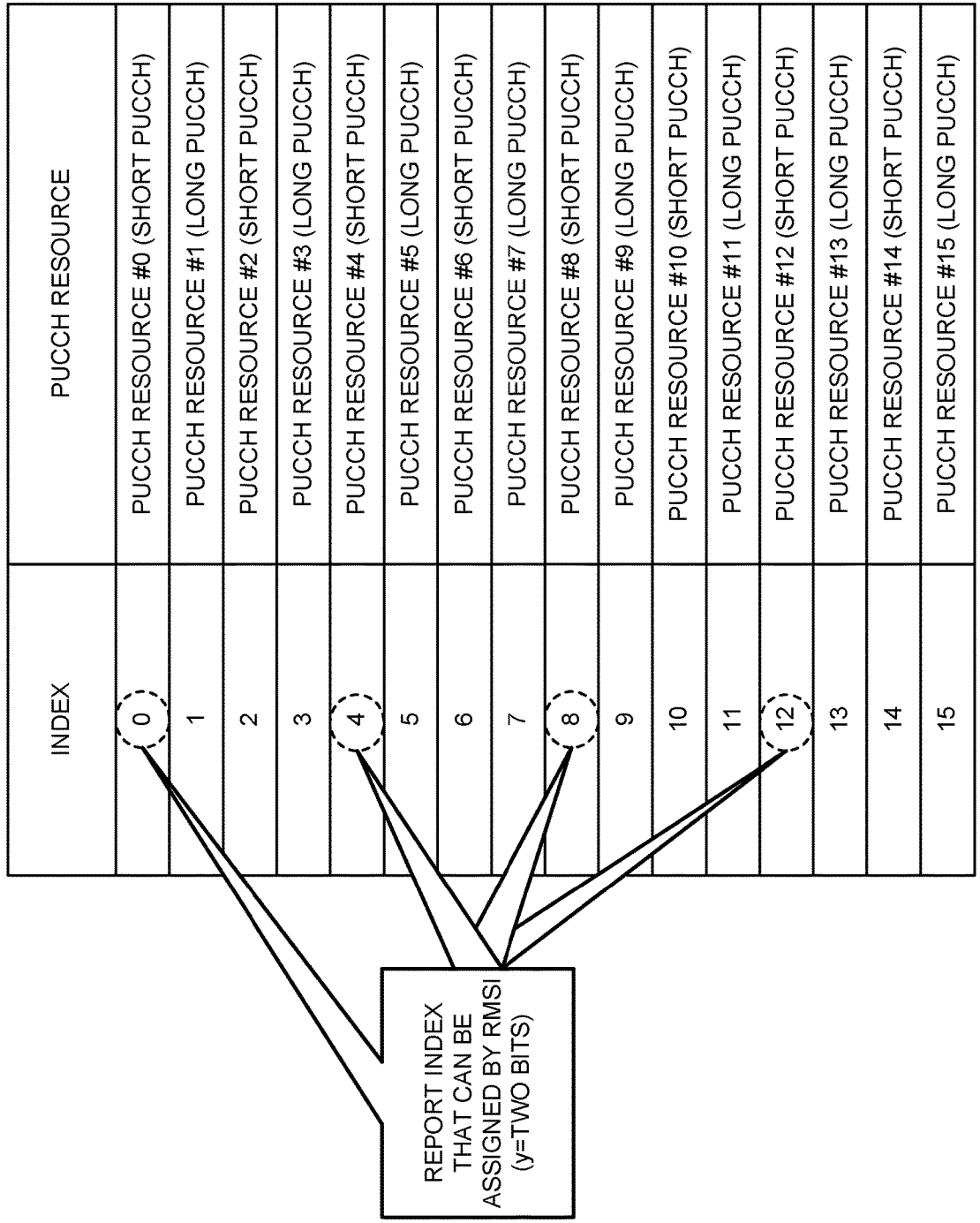
FIG. 10 is a diagram to show examples of possible given field values of RMSI according to the second example.

FIG. 10 is a diagram to show examples of possible given field values of RMSI according to the second example. As shown in FIG. 10, the user terminal may assume that the indices of PUCCH resources to be specified by a given field value in RMSI are limited.

Based on the number y of bits of a given field in the DCI, for example, using the following equation, the user terminal may determine the indices of PUCCH resources specified by a given field value in RMSI. Here, m is a given subscript.

$$\text{Index} = (2^y) \cdot m, \text{where } m = 0,1,2,3, \ldots$$

For example, in FIG. 10, y=2 holds, and therefore indices #0, #4, #8, and #12 of the PUCCH resources specified by a given field value in RMSI may be determined based on the above equation.

Alternatively, the user terminal may determine, on a fixed basis, the indices of PUCCH resources specified by a given field value in RMSI, regardless of the number y of bits of the given field in DCI.

As shown in FIG. 10, the indices of PUCCH resources specified by a given field value in RMSI are limited, so that it is possible to reduce the number of bits of the given field, and reduce the overhead of RMSI. Also, the indices of PUCCH resources specified by a given field value in RMSI are limited, so that it is possible to allocate more candidate PUCCH resources while keeping the number of bits of RMSI the same, and improve the communication quality of PUCCH. For example, in the event the given field in RMSI is kept at four bits, limiting the indices that can be assigned by the RMSI to 0, 4, 8, 12 and so forth would make it possible to allocate PUCCH resources to the UE from four times as many PUCCH resource candidates (in this case, 64 candidates).

In the second example, a PUCCH resource set to include one or more PUCCH resources is determined based on one PUCCH resource indicated by a given field value in RMSI. Therefore, the overhead of RMSI can be reduced compared to the case in which the PUCCH resource set is reported (configured) by using RMSI.

Third Example

A third example is different from the second example, in which a given field value of RMSI indicates one PUCCH resource, in that the given field value indicates a number of PUCCH resources among a given number of PUCCH resources determined in advance.

In the third example, the user terminal may determine a PUCCH resource set that includes a number of PUCCH resources indicated by a given field value of RMSI. The user terminal determines one PUCCH resource in the PUCCH resource set based on a given field value in DCI, and transmits UCI by using the determined PUCCH resource.

Figure 11:
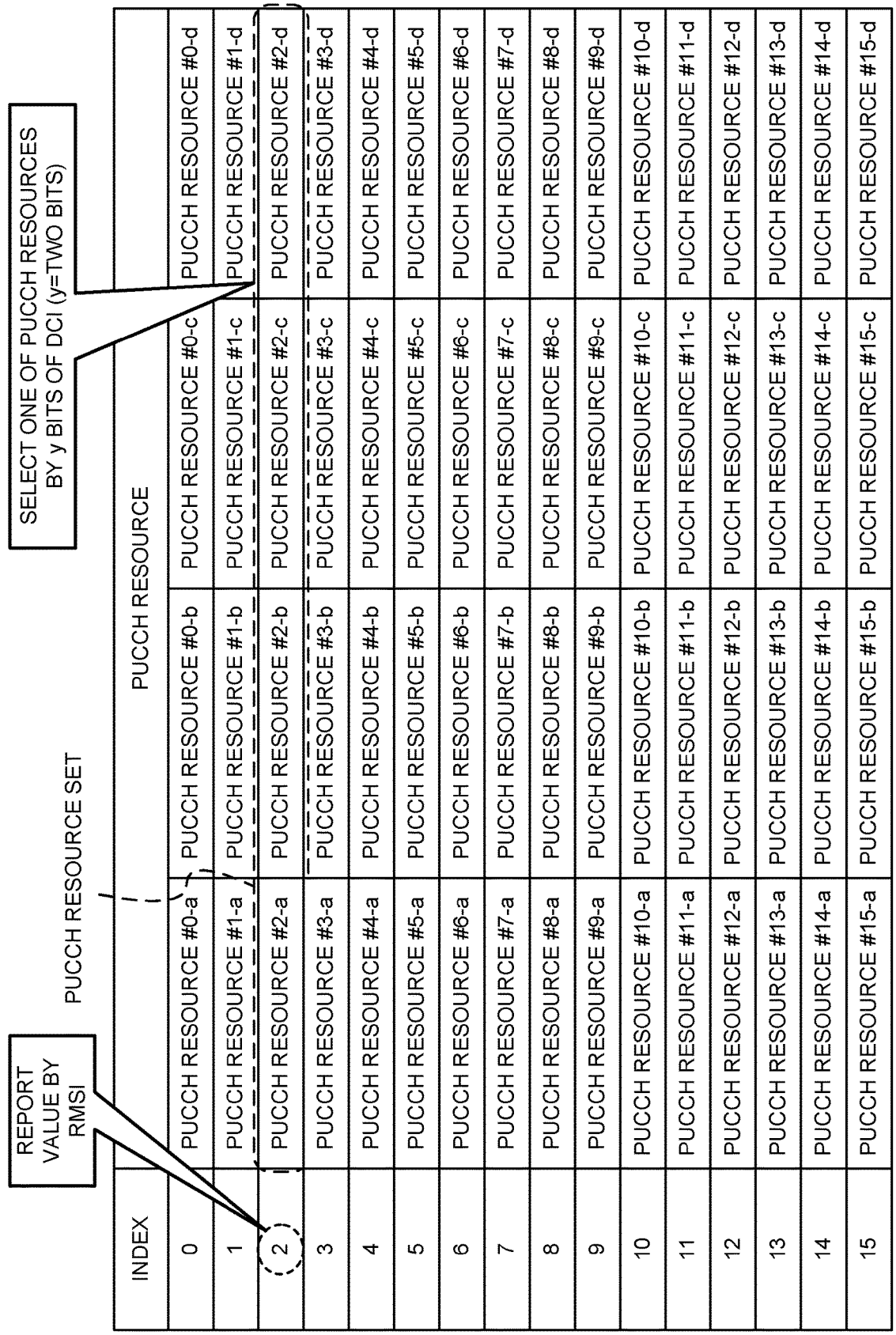
FIG. 11 is a diagram to show a first example of how to determine a PUCCH resource set, according to a third example of the present invention.

FIG. 11 is a diagram to show the first example of how to determine a PUCCH resource set according to the second example. In FIG. 11, a given number of PUCCH resources (here, 64 types of PUCCH resources #i-a to #i-d (0≤i≤15)) are defined in advance in the specification.

In FIG. 11, one index is assigned (associated, linked. etc.) to a number of PUCCH resources. The given field values in RMSI may show indices that are associated with a number of PUCCH resources.

For example, in FIG. 11, a given field value of RMSI indicates an index "2," which is associated with PUCCH resources #2-a to #2-d. The user terminal determines the PUCCH resource set based on this index. As shown in FIG. 11, the user terminal may determine a PUCCH resource set that includes $2^y$ PUCCH resources #2-a to #2-d, associated with this index "2." Here, y is the number of bits of the given field in DCI.

Based on given rules, the user terminal may associate each given field value in DCI with a PUCCH resource in the PUCCH resource set. For example, in FIG. 11, the given field values "00," "01," "10," and "11" in DCI may be associated with PUCCH resources #2-a, #2-b, #2-c, and #2-d in the PUCCH resource set, respectively.

The user terminal may determine the PUCCH resources associated with (indicated by) the given field values in DCI (which is, for example, DCI to schedule message 2 or 4), and transmit UCI by using the PUCCH resources determined.

Note that the user terminal may determine one PUCCH resource in a PUCCH resource set that is determined based on a given field value in RMSI, without using the above-described given field values in DCI, but instead by using y-bit implicit indices. The implicit index value can be derived in the same manner as in the second example.

Furthermore, the user terminal may determine one PUCCH resource in a PUCCH resource set that is determined based on a given field value in RMSI, by using the above-described given field values in DCI and the implicit indices. For example, some of the parameters in the parameter set shown in FIG. 2 (for example, at least one of the starting index of PRBs, the index of the initial CS and the index of time-domain OCC) may be explicitly specified (may be part of the PUCCH resources specified). The rest of the parameters may be derived implicitly.

FIG. 12 is a diagram to show a second example of how to determine PUCCH resources according to the third example. In FIG. 12, as in FIG. 11, a given field value in RMSI indicates an index associated with a number of PUCCH resources.

As shown in FIG. 12, the number of PUCCH resources in the PUCCH resource set determined based on a given field value of RMSI is determined based on the number y of bits of the given field in DCI. For example, the number of the PUCCH resources may be $2^y$.

The number y of bits of the given field in DCI may vary depending on DCI format. For example, in the event DCI (also referred to as "fallback DCI" and so on) is allocated to a common search space, the above number of bits may be y=1. Also, in the event DCI is allocated to a user terminal-specific search space (also referred to as "non-fallback DCI" and so on), the above number of bits may be y=2.

For example, as shown in FIG. 12, if the given field in DCI is one bit, the user terminal may determine a PUCCH resource set that includes two PUCCH resources (for example, PUCCH resources #10-a and #10-b) associated with the index indicated by the given field value in RMSI (for example, "10"). In FIG. 12A, the DCI-induced overhead can be reduced.

Furthermore, as shown in FIG. 12B, if the given field in DCI is two bits, the user terminal may determine a PUCCH resource set that includes four PUCCH resources (for example, PUCCH resources #2-a to #2-b) associated with the index indicated by the given field value in RMSI (for example, "2"). In FIG. 12B, more types of PUCCH resources can be specified dynamically than in FIG. 12A, so that an effect of improving performance can be achieved.

FIG. 13 is a diagram to show a third example of how to determine a PUCCH resource set according to the second example. As shown in FIG. 13, a number of PUCCH resources associated with the same index may be comprised of PUCCH resources for short PUCCH (for example, PF 0) and PUCCH resources for long PUCCH (for example, PF 1).

In FIG. 13, for the same index, PUCCH resources for short PUCCH and PUCCH resources for long PUCCH are associated at the same ratio.

For example, in FIG. 13, a PUCCH resource for short PUCCH and a PUCCH resource for long PUCCH are associated within the same index. Also, in FIG. 13, within multiple PUCCH resources associated with the same index, neighboring indices are assigned to PUCCH resources for short PUCCH and resources for long PUCCH.

By this means, if the given field in DCI is y (y≥1) bits, PUCCH resources that are determined based on the given field value of RMSI include, equally, PUCCH resources for short PUCCH (in FIG. 13, PUCCH resources #4-a and #4-c) and PUCCH resources for long PUCCH (in FIG. 13, PUCCH resources #4-b and #4-d).

Accordingly, whether the given field value of RMSI indicates short PUCCH or long PUCCH, the given field value in DCI can specify the short PUCCH or long PUCCH.

FIG. 14 is a diagram to show a fourth example of how to determine a PUCCH resource set according to the second example. FIG. 14 is different from FIG. 13 in that PUCCH resources for short PUCCH and PUCCH resources for long PUCCH may be associated with the same index, not only at the same ratio, but also at different ratios.

In FIG. 14, the given field value in RMSI is subject to control, so that it is possible to control the number of PUCCH resources for short PUCCH and PUCCH resources for long PUCCH included in a PUCCH resource set.

For example, in FIG. 14, the given field value of RMSI is set to "2," so that the user terminal can determine a PUCCH resource set that includes three PUCCH resources #2a to #2c for short PUCCH and one PUCCH resource #2-d for long PUCCH.

Meanwhile, in FIG. 14, the given field value of RMSI is set to "13," so that the user terminal can determine a PUCCH resource set that includes one PUCCH resource #13-a for short PUCCH and three PUCCH resources #13-b to #13-d for long PUCCH.

Fourth Example

With a fourth example of the present invention, a number of sets that each include a given number of PUCCH resources are selected. A given field value of RMSI may indicate a PUCCH resource in a set that is determined according to given rules.

As explained in the second example, a table that associates one PUCCH resource in each set, with an index, may be used. For example, the tables exemplified in FIG. 5 to FIG. 9 may be provided per set. A user terminal may look up the table of a set that is selected based on given rules, and determine a PUCCH resource set based on the index that is indicated by a given field value in RMSI.

Alternatively, as explained with the third example, a table that associates a number of PUCCH resources in each set, with indices, may be used. For example, the tables exemplified in FIG. 11 to FIG. 14 may be provided per set. A user terminal may look up the table of a set that is selected based on given rules, and determine a PUCCH resource set based on the index that is indicated by a given field value in RMSI.

As for the given rules, for example, at least one of following rules (1) to (4) may be used.

Rule (1) may be whether or not the center frequency fc is equal to or lower than (or lower than) a given threshold (for example, 6 GHz). For example, when the center frequency fc is lower than a given threshold, a set to include more PUCCH resources for long PUCCH may be selected. On the other hand, when the center frequency fc exceeds a given threshold, a set to include more PUCCH resources for short PUCCH may be selected. This is because, in a high frequency band (for example, fc is greater than 6 GHz), the path loss is large, and the coverage is likely to be small.

Rule (2) may be whether a carrier is a time division duplexing (TDD) carrier or a frequency division duplexing (FDD) carrier. For example, when an FDD carrier is used, a set to include more PUCCH resources for long PUCCH may be selected. On the other hand, when a TDD carrier is used, a set to include more PUCCH resources for short PUCCH may be selected. This is because a TDD carrier is assumed to have low latency and a high frequency, and the coverage is likely to be small.

Rule (3) may be based on RACH format (or the timing of random access preamble). For example, a set may be selected depending on whether the RACH format is dense or rural. Also, if a random access preamble is shorter than a given threshold (=the RACH format is dense), a set to include more PUCCH resources for short PUCCH may be selected. If the random access preamble is shorter than a given threshold (=the RACH format is rural), a set to include more PUCCH resources for long PUCCH may be selected.

Fifth Example

In a fifth example of the present invention, the transmission bandwidth of UCI that is transmitted in PUCCH resources determined as described above will be described. Note that, in the fifth example, an HARQ-ACK in response to message 4 will be exemplified as this UCI, but this is by no means limiting.

An HARQ-ACK in response to message 4 may be transmitted in the initial active UL BWP described above. The DCI to schedule message 4 may indicate a PRB index in the initial active UL BWP. Note that the initial active UL BWP is configured by RMSI.

Alternatively, an HARQ-ACK in response to message 4 may be transmitted in an uplink BWP (current active UL BWP) that is for non-initial access and that corresponds to the downlink BWP that is currently in the active state (current active DL BWP).

The BWP adaptation may support PRACH in any UL BWP configuration. The same mechanism as initial access may be used to determine the PUCCH resource for an HARQ-ACK in response to message 4. Also, an HARQ-ACK in response to message 4 for non-initial access may be transmitted based on user-specific RRC signaling and DCI, similar to a user-specific HARQ-ACK.

Sixth Example

With a sixth example of the present invention, how to determine the timing (slot index) for transmitting UCI in PUCCH resources determined as described above will be described. Note that, in the sixth example, an HARQ-ACK in response to message 4 will be exemplified as this UCI, but this is by no means limiting.

The user terminal may determine a slot for transmitting this UCI by using at least one of a given field value of RMSI and a given field value in DCI.

Alternatively, the user terminal may determine the slot for transmitting this UCI based on an implicit method. For example, the user terminal may determine the slot by using one of following methods (1) to (7).

(1) The user terminal transmits an HARQ-ACK in response to message 4 a given number (k) of slots after the slot in which message 4 is received. The given number (k) may be defined in advance in the specification, or may be indicated by a given field value in RMSI. For example, as shown in FIG. 15A, a given field value (also referred to as an "index," a "slot indicator," and so on) in RMSI may be associated with the number of slots from message 4 (also referred to as "slot distance," and so on).

Alternatively, (2) a given field value in DCI (for example, DCI to schedule message 4) indicates the period (the number of slots) between message 4 and the HARQ-ACK in response to message 4. For example, as shown in FIG. 15A, a given field value (also referred to as an "index," a "slot indicator," and so on) in DCI may be associated with the number of slots from message 4.

Alternatively, (3) the period (the number of slots) between message 4 and the HARQ-ACK in response to message 4 may be indicated implicitly. For example, the user terminal may derive this period based on at least one of the CCE index, the UE-ID and the number of PRBs to allocate to the PDSCH for transmitting above message 4. For example, these parameters may be modulo-operated with the type X of the number of slots determined in advance.

Alternatively, (4) X types of patterns for the number of slots determined in advance may vary depending on PUCCH format. For example, when transmitting an HARQ-ACK in response to message 4 in short PUCCH, as shown in FIG. 15B, a table configured with a relatively small number of slots from message 4 may be used. This is because short PUCCH is required low latency and required to transmit HARQ-ACK at an early timing.

On the other hand, when transmitting an HARQ-ACK in response to message 4 in long PUCCH, as shown in FIG. 15C, a table in which the number of slots from message 4 is set larger than in FIG. 15B may be used. This is because low latency is not required for long PUCCH.

Alternatively, (5) the number of slots from message 4 may be determined, on a fixed basis, by PUCCH format. As shown in FIG. 15C, for example, when an HARQ-ACK in response to message 4 is transmitted in short PUCCH, the number of slots from message 4 may be zero, and, when this HARQ-ACK is transmitted in long PUCCH, the number of the slots may be four.

Note that the number of slots from message 4 may or may not be exact. The user terminal has only to transmit an HARQ-ACK in response to message 4 in an uplink slot that is available after an indicated number of slots. The user terminal can recognize in which slot the HARQ-ACK is transmitted, from the configuration information that is broadcast in SIB 1 (for example, 4 HARQ-ACK by tdd-UL-DL-configuration).

(Other Examples)

Although cases of determineing PUCCH resources for use for transmitting UCI before RRC connection is set up have been described with the above examples, the present embodiment can be applied, even after RRC connection is established, as long as given conditions are fulfilled. For example, when fallback of PUCCH format is triggered, even after RRC connection is established, PUCCH resources (also referred to as "fallback PUCCH resources" and so on) can be determined based on the PUCCH resource determine ion method (also referred to as "method for determineing PUCCH resources for initial access" and so on) according to present embodiment.

Furthermore, switching to the method for determineing PUCCH resources for initial access may be performed based on at least one of PUCCH format fallback (switching) command information and configuration information from the radio base station. At least one of the command information and the configuration information may be reported by a given bit (for example, one bit) in specific DCI.

At least one of the PUCCH format (PF) and PUCCH resources (PF/PUCCH resource) determined by the method according to the present embodiment can be assumed to be a PF/PUCCH resource to fulfill given quality (error detection rate). Consequently, when a fallback is commanded to the user terminal due to the deterioration of the communication quality of the user terminal, it is possible to improve the quality of UCI by determineing the PF/PUCCH resources by the method according to the present embodiment.

(Radio Communication System)

Now, the structure of a radio communication system according to the present embodiment will be described below. In this radio communication system, the radio communication methods according to the above-described embodiments are employed. Note that the radio communication methods according to the herein-contained embodiments may be each used alone, or at least two of them may be combined and used.

Figure 16:
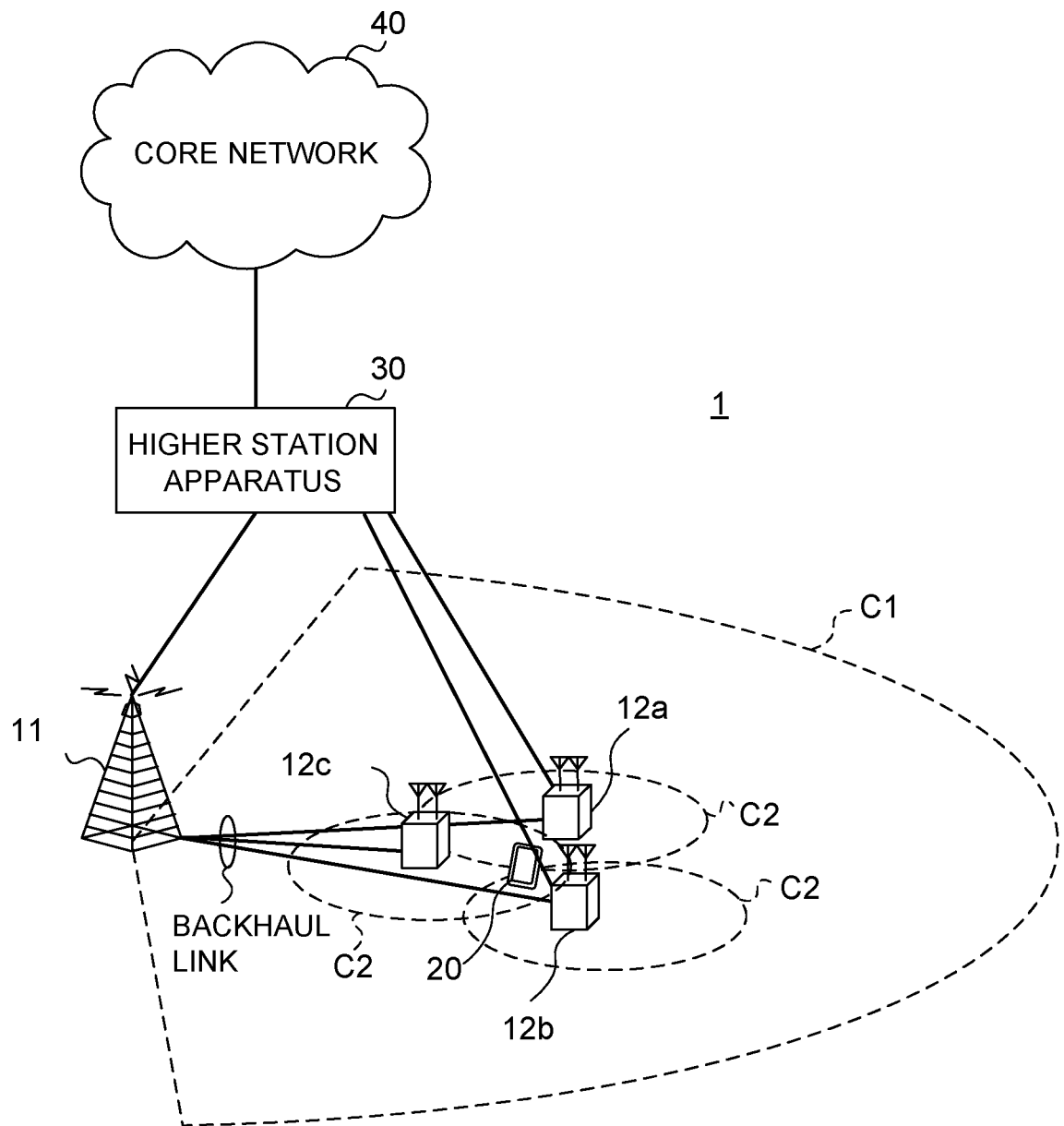
FIG. 16 is a diagram to show an exemplary schematic structure of a radio communication system according to the present embodiment.

FIG. 16 is a diagram to show an exemplary schematic structure of a radio communication system according to the present embodiment. A radio communication system 1 can adopt carrier aggregation (CA) and/or dual connectivity (DC) to group a number of fundamental frequency blocks (component carriers) into one, where the LTE system bandwidth (for example, 20 MHz) constitutes one unit. Note that the radio communication system 1 may be referred to as "SUPER 3G," "LTE-A, (LTE-Advanced)" "IMT-Advanced," "4G," "5G," "FRA (Future Radio Access)," "NR (New RAT (New Radio Access Technology))," and the like.

The radio communication system 1 shown in FIG. 16 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different numerologies are applied between cells/within cells may be adopted here.

Here, a numerology refers to a communication parameter in the frequency direction and/or the time direction (for example, at least one of subcarrier spacing, the bandwidth, the length of a symbol, the length of CP (CP length), the length of a subframe, the time length of a TTI (TTI length), the number of symbols per TTI, the radio frame configuration, the filtering process, the windowing process, etc.). In the radio communication system 1, for example, subcarrier spacings such as 15 kHz, 30 kHz, 60 kHz, 120 kHz and 240 kHz may be supported.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a number of cells (CCs) (for example, two or more CCs). Furthermore, the user terminals can use licensed-band CCs and unlicensed-band CCs as a number of cells.

Furthermore, the user terminals 20 can communicate based on time division duplexing (TDD) or frequency division duplexing (FDD) in each cell. A TDD cell and an FDD cell may be referred to as a "TDD carrier (frame structure type 2)" and an "FDD carrier (frame structure type 1)," respectively.

Furthermore, in each cell (carrier), a single numerology may be used, or a number of different numerologies may be used.

Between the user terminals 20 and the radio base station 11, communication can be carried out using a carrier of a relatively low frequency band (for example, 2 GHz) and a narrow bandwidth (referred to as, for example, an "existing carrier," a "legacy carrier," and/or the like). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "gNB (gNodeB)," a "transmitting/receiving point (TRP)," and so on. Also, the radio base stations 12 are radio base stations each having a local coverage, and may be referred to as "small base stations," "micro base stations," "pico base stations," "femto base stations," "HeNBs (Home eNodeBs)," "RRHs (Remote Radio Heads)," "eNBs," "gNBs," "transmitting/receiving points" and so on. Hereinafter, the radio base stations 11 and 12 will be collectively referred to as "radio base stations 10," unless specified otherwise.

The user terminals 20 are terminals that support various communication schemes such as LTE, LTE-A, 5G, NR and so on, and may not be limited to mobile communication terminals, and may be stationary communication terminals. Furthermore, the user terminals 20 can perform device-to-device (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a number of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a number of terminals to use mutually different bands. Note that the uplink and downlink radio access schemes are not limited to the combination of these, and OFDMA may be used in the UL.

Also, in the radio communication system 1, a multi-carrier waveform (for example, OFDM waveform) or a single-carrier waveform (for example, DFT-s-OFDM waveform) may be used.

In the radio communication system 1, a DL shared channel (PDSCH (Physical Downlink Shared CHannel), also referred to as a "DL data channel" or the like), which is shared by each user terminal 20, a broadcast channel (PBCH (Physical Broadcast CHannel)), downlink L1/L2 control channels and so on are used as DL channels. At least one of user data, higher layer control information, SIBs (System Information Blocks) and so forth is communicated by the PDSCH. Also, the MIB (Master Information Blocks) is communicated by the PBCH.

The L1/L2 control channels include DL control channels (such as PDCCH (Physical Downlink Control CHannel), EPDCCH (Enhanced Physical Downlink Control CHannel), etc.), PCFICH (Physical Control Format Indicator CHannel), PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. HARQ retransmission control information (ACK/NACK) in response to the PUSCH can be communicated in at least one of the PHICH, the PDCCH and the EPDCCH.

In the radio communication system 1, a UL shared channel (PUSCH (Physical Uplink Shared CHannel), also referred to as an "uplink shared channel" or the like), which is shared by each user terminal 20, an uplink control channel (PUCCH (Physical Uplink Control CHannel)), a random access channel (PRACH (Physical Random Access CHannel)) and so on are used as UL channels. User data, higher layer control information and so on are communicated by the PUSCH. Uplink control information (UCI), including at least one of retransmission control information (ACK/NACK) in response to DL signals, channel state information (CSI) and so on, is communicated by the PUSCH or the PUCCH. By means of the PRACH, random access preambles for establishing connections with cells can be communicated.

<Radio Base Station>

Figure 17:
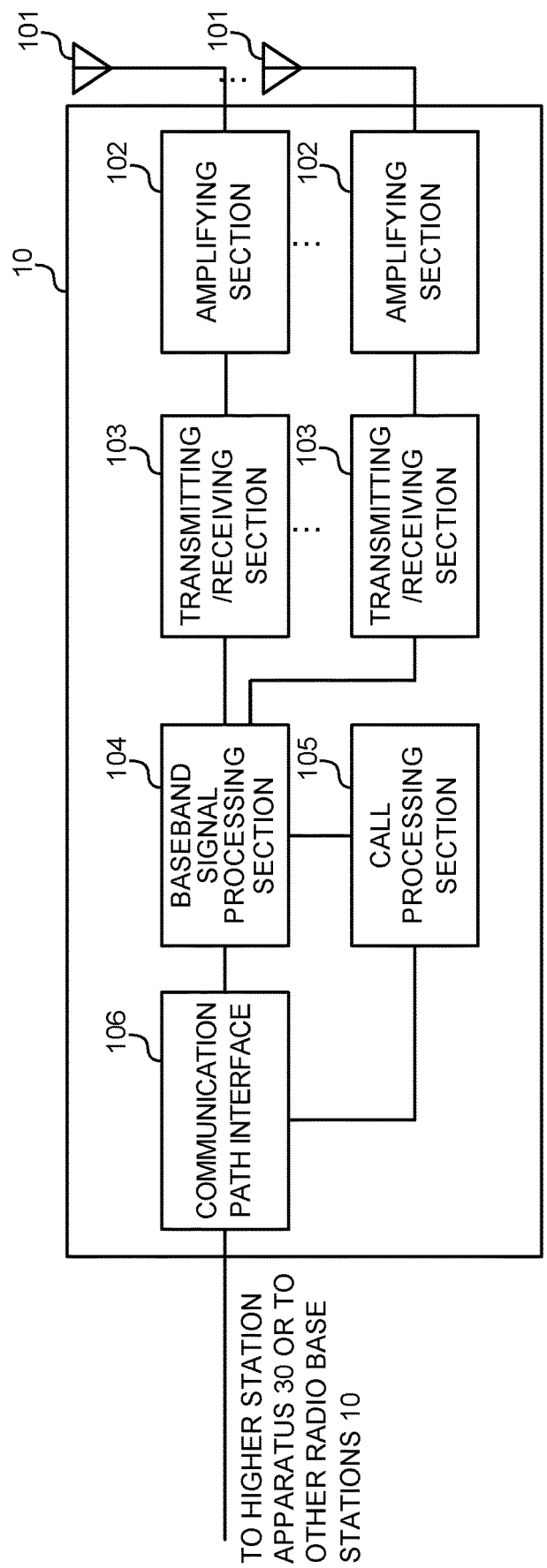
FIG. 17 is a diagram to show an exemplary overall structure of a radio base station according to the present embodiment.

FIG. 17 is a diagram to show an exemplary overall structure of a radio base station according to the present embodiment. A radio base station 10 has a number of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 in DL is input from the higher station apparatus 30, to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process, a precoding process and so forth, and the result is forwarded to each transmitting/receiving section 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

A transmitting/receiving section 103 can be constituted by a transmitters/receiver, a transmitting/receiving circuit or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a given interface. Also, the communication path interface 106 may transmit and receive signals (backhaul signaling) with neighboring radio base stations 10 via an inter-base station interface (which is, for example, optical fiber in compliance with the CPRI (Common Public Radio Interface), the X2 interface, etc.).

Furthermore, the transmitting/receiving sections 103 transmit DL signals (including at least one of DL data signals, DL control signals and DL reference signals) to the user terminal 20, and receive UL signals (including at least one of UL data signals, UL control signals and UL reference signals) from the user terminal 20.

Also, the transmitting/receiving sections 103 receive UCI from the user terminal 20 by using an uplink shared channel (for example, PUSCH) or an uplink control channel (for example, short PUCCH and/or long PUCCH). This UCI may include at least one of an HARQ-ACK in response to a DL data channel (for example, PDSCH), CSI, an SR, beam identification information (for example, a beam index (BI)), and a buffer status report (BSR).

Also, the transmitting/receiving sections 103 may transmit control information about an uplink control channel (for example, short PUCCH, long PUCCH, and/or the like) (for example, at least one of the format, the number of PUCCH units in a slot, the size of a PUCCH unit, the method of multiplexing RS, the location where RS is allocated, whether or not RS is present, the density of RS, whether or not SRS is present, and the resource for an uplink control channel) by physical layer signaling (L1 signaling) and/or higher layer signaling.

Also, the transmitting/receiving sections 103 may transmit information about fallback (for example, the command information and/or configuration information described above).

Figure 18:
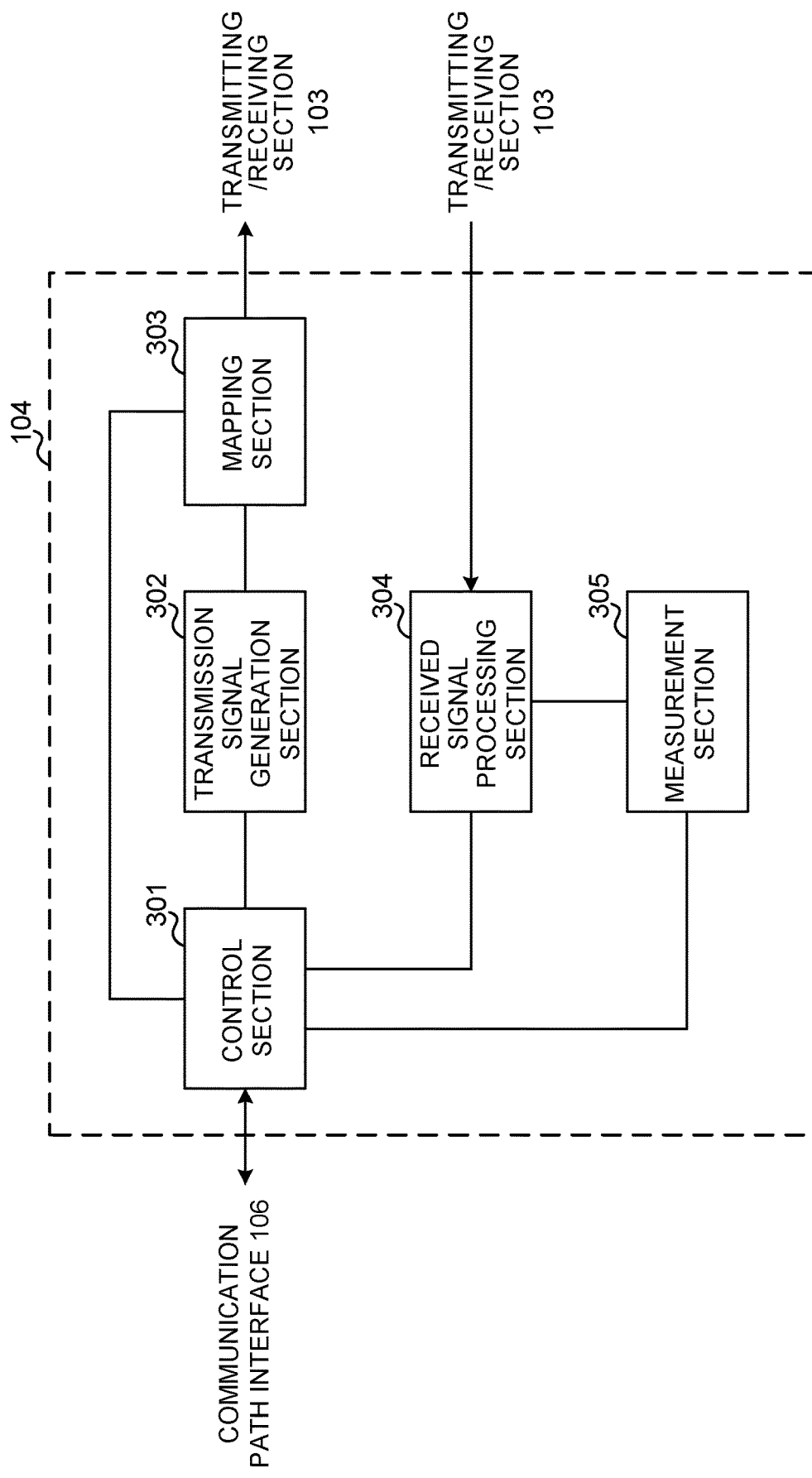
FIG. 18 is a diagram to show an exemplary functional structure of a radio base station according to the present embodiment.

FIG. 18 is a diagram to show an exemplary functional structure of a radio base station according to the present embodiment. Note that, although FIG. 18 primarily shows functional blocks that pertain to characteristic parts of the present embodiment, the radio base station 10 has other functional blocks that are necessary for radio communication as well. As shown in FIG. 18, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, the generation of DL signals by the transmission signal generation section 302, the mapping of DL signals by the mapping section 303, the receiving processes (for example, demodulation) for UL signals by the received signal processing section 304 and the measurements by the measurement section 305.

To be more specific, the control section 301 schedules user terminals 20. To be more specific, the control section 301 may control scheduling and/or retransmission for the DL data and/or uplink shared channels based on UCI (for example, CSI and/or BI) from the user terminal 20.

Also, the control section 301 may exert control so that the format of an uplink control channel (for example, long PUCCH and/or short PUCCH) is controlled, and control information related to this uplink control channel is transmitted.

Furthermore, the control section 301 may control PUCCH resources. To be more specific, the control section 301 may determine one or more PUCCH resources to configure in the user terminal 20, from a given number of PUCCH resources that are defined in advance in the specification. In addition, the control section 301 may control at least one of generation and transmission of system information (for example, RMSI) indicating at least one of the determined PUCCH resources.

The control section 301 may control the received signal processing section 304 to perform receiving processes for the UCI from the user terminal 20 based on the format of the uplink control channel.

The control section 301 can be constituted by a controller, a control circuit or control apparatus that can be described based on general understanding of the technical field to which the present invention pertains.

The transmission signal generation section 302 generates DL signals (including DL data signals, DL control signals, DL reference signals and so on) as commanded by the control section 301, and outputs these signals to the mapping section 303.

The transmission signal generation section 302 can be constituted by a signal generator, a signal generating circuit or signal generating apparatus that can be described based on general understanding of the technical field to which the present invention pertains.

The mapping section 303 maps the DL signal generated in the transmission signal generation section 302 to a radio resource, as commanded by the control section 301, and outputs this to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding, etc.) of UL signals transmitted from the user terminals 20 (including, for example, a UL data signal, a UL control signal, a UL reference signal, etc.). To be more specific, the received signal processing section 304 may output the received signals, the signals after the receiving processes and so on, to the measurement section 305. In addition, the received signal processing section 304 performs UCI receiving processes based on the uplink control channel format specified by the control section 301.

The measurement section 305 conducts measurements with respect to the received signals. The measurement section 305 can be constituted by a measurer, a measurement circuit or measurement apparatus that can be described based on general understanding of the technical field to which the present invention pertains.

Also, the measurement section 305 may measure the channel quality in UL based on, for example, the received power (for example, RSRP (Reference Signal Received Power)) and/or the received quality (for example, RSRQ (Reference Signal Received Quality)) of UL reference signals. The measurement results may be output to the control section 301.

<User Terminal>

Figure 19:
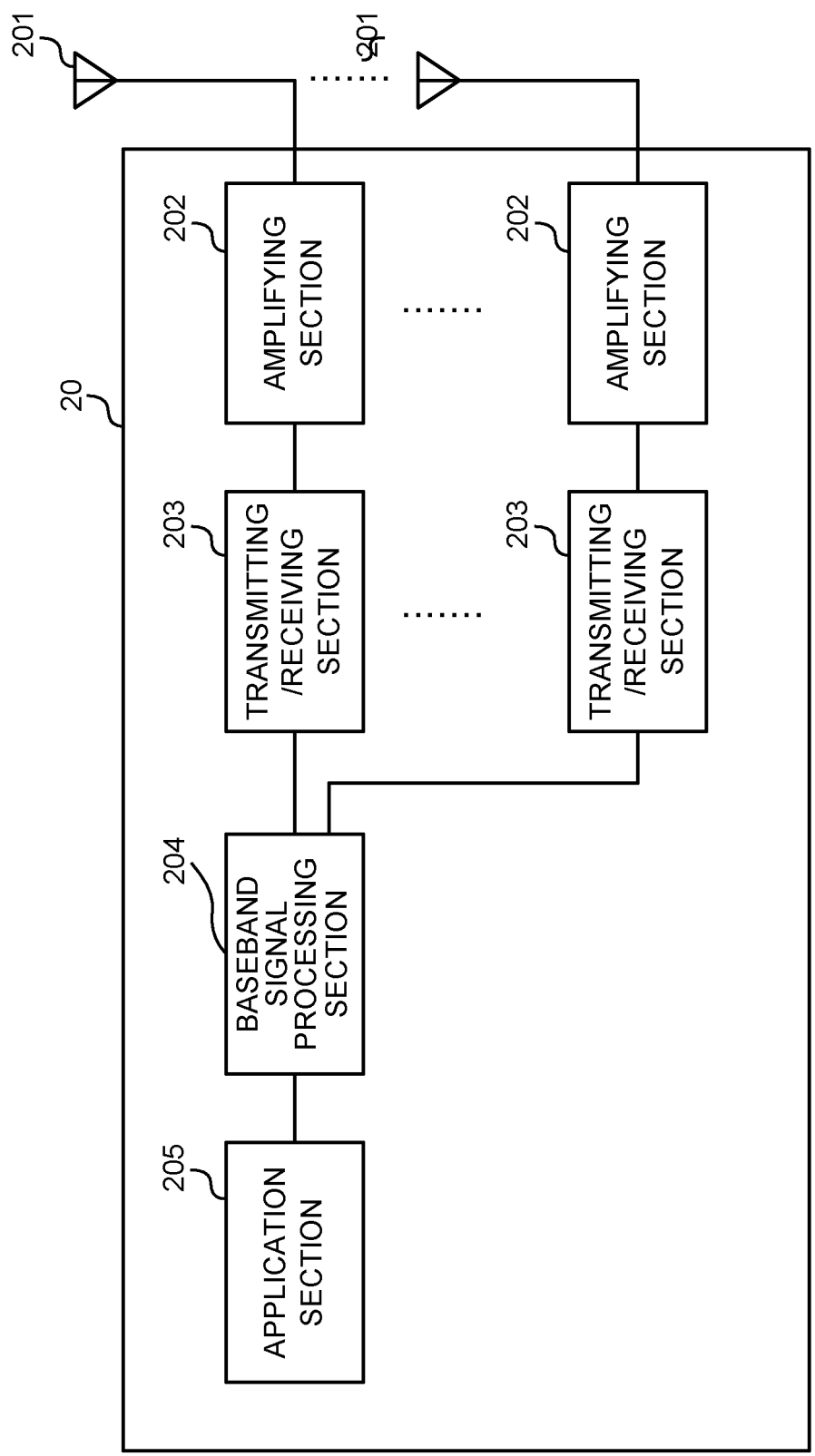
FIG. 19 is a diagram to show an exemplary overall structure of a user terminal according to the present embodiment.

FIG. 19 is a diagram to show an exemplary overall structure of a user terminal according to the present embodiment. A user terminal 20 has a number of transmitting/receiving antennas 201 for MIMO communication, amplifying sections 202, transmitting/receiving sections 203, a baseband signal processing section 204 and an application section 205.

Radio frequency signals that are received in multiple transmitting/receiving antennas 201 are amplified in the amplifying sections 202. The transmitting/receiving sections 203 receive DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to an FFT process, error correction decoding, a retransmission control receiving process, and so on. The DL data is forwarded to the application section 205. The application section 205 performs processes related to higher layers above the physical layer and the MAC layer, and so on. Also, the broadcast information is also forwarded to application section 205.

Meanwhile, UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving section 203. UCI is also subjected to at least one of channel coding, rate matching, puncturing, a DFT process and an IFFT process, and the result is forwarded to each transmitting/receiving section 203.

Baseband signals that are output from the baseband signal processing section 204 are converted into a radio frequency band in the transmitting/receiving sections 203, and transmitted. The radio frequency signals that are subjected to frequency conversion in the transmitting/receiving sections 203 are amplified in the amplifying sections 202, and transmitted from the transmitting/receiving antennas 201.

Furthermore, the transmitting/receiving sections 203 receive DL signals (including DL data signals, DL control signals and DL reference signals) of the numerologies configured in the user terminal 20, and transmit UL signals (including UL data signals, UL control signals and UL reference signals) of these numerologies.

Also, the transmitting/receiving sections 203 transmit UCI to the radio base station 10 by using an uplink shared channel (for example, PUSCH) or an uplink control channel (for example, short PUCCH and/or long PUCCH).

Also, the transmitting/receiving sections 203 may transmit control information about an uplink control channel (for example, short PUCCH, long PUCCH, and/or the like) (for example, at least one of the format, the number of PUCCH units in a slot, the size of a PUCCH unit, the method of multiplexing RS, the location where RS is allocated, whether or not RS is present, the density of RS, whether or not SRS is present, and the resource for an uplink control channel) by physical layer signaling (L1 signaling) and/or higher layer signaling.

A transmitting/receiving sections 203 can be constituted by a transmitter/receiver, a transmitting/receiving circuit or transmitting/receiving apparatus that can be described based on general understanding of the technical field to which the present invention pertains. Furthermore, a transmitting/receiving sections 203 may be structured as one transmitting/receiving section, or may be formed with a transmitting section and a receiving section.

Figure 20:
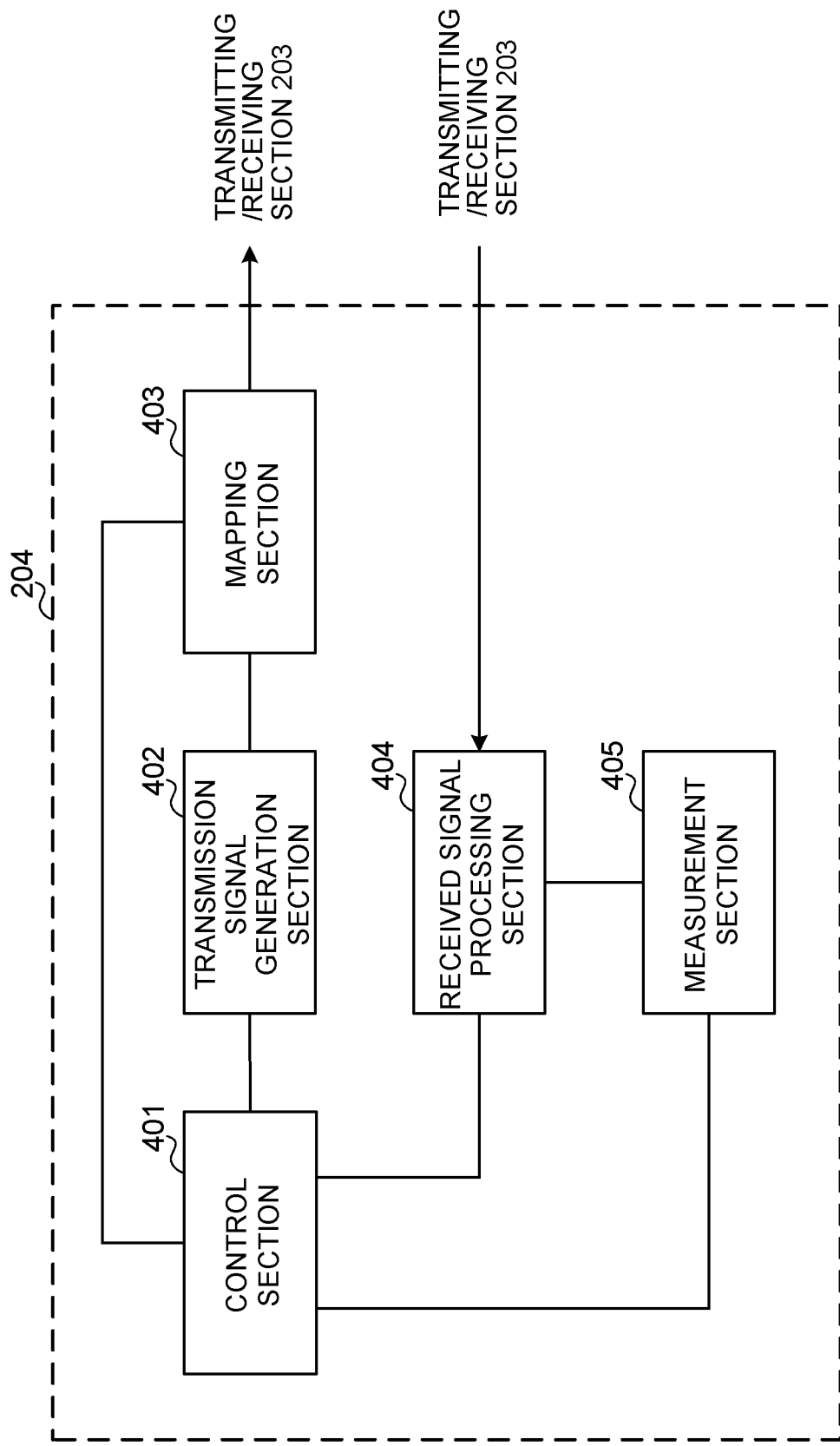
FIG. 20 is a diagram to show an exemplary functional structure of a user terminal according to the present embodiment.

FIG. 20 is a diagram to show an exemplary functional structure of a user terminal according to the present embodiment. Note that, although FIG. 20 primarily shows functional blocks that pertain to characteristic parts of the present embodiment, the user terminal 20 has other functional blocks that are necessary for radio communication as well. As shown in FIG. 20, the baseband signal processing section 204 provided in the user terminal 20 has a control section 401, a transmission signal generation section 402, a mapping section 403, a received signal processing section 404, and a measurement section 405.

The control section 401 controls the whole of the user terminal 20. The control section 401 controls, for example, the generation of UL signals in the transmission signal generation section 402, the mapping of UL signals in the mapping section 403, the DL signal receiving processes in the received signal processing section 404, the measurements in the measurement section 405 and so on.

In addition, the control section 401 controls the uplink control channel to use to transmit UCI from the user terminal 20 based on explicit indications from the radio base station 10 or based on implicit determine ion in the user terminal 20.

Also, the control section 401 may control the format of the uplink control channel (for example, long PUCCH and/or short PUCCH). The control section 401 may control the uplink control channel's format based on control information from the radio base station 10. In addition, the control section 401 may control the PUCCH format (the uplink control channel format) to use to transmit UCI based on information that relates to fallback.

Furthermore, the control section 401 may determine the PUCCH resource to use in the PUCCH format based on higher layer signaling and/or downlink control information (third example).

To be more specific, when UCI is transmitted by using the uplink control channel before RRC (Radio Resource Control) connection is set up, the control section 401 may determine the resource for the uplink control channel to use to transmit the UCI based on a given field value in system information (for example, RMSI).

Furthermore, the control section 401 may determine the resource for the uplink control channel from a number of resources indicated by a given field value in system information, based on a given field value in downlink control information (first example).

Also, the control section 401 determines a resource set that includes one or more resources, based on an index indicated by a given field value in system information, and determine the resource for the uplink control channel, from the resource set, based on a given field value in downlink control information (second and third example).

The resource set may include resources with a given number of indices that are contiguous from the above index (second example). Alternatively, the resource set may include a given number of resources associated with the index (third example).

Also, the control section 401 may look up the table of a set (or a table of the set) that is selected based on given rules, and determine a PUCCH resource set based on the index that is indicated by a given field value in RMSI (fourth example).

The control section 401 may control the random access procedures. To be more specific, the control section 401 may control the timing for transmitting an HARQ-ACK in response to message 4 (sixth example).

For the control section 401, a controller, a control circuit or control apparatus that can be described based on general understanding of the technical field to which the present invention pertains can be used.

In the transmission signal generation section 402, UL signals (including UL data signals, UL control signals, UL reference signals, UCI, etc.) are generated (including, for example, encoding, rate matching, puncturing, modulation, etc.) as commanded by the control section 401, and output to the mapping section 403. The transmission signal generation section 402 can be constituted by a signal generator, a signal generating circuit or signal generating apparatus that can be described based on general understanding of the technical field to which the present invention pertains.

The mapping section 403 maps the UL signals generated in the transmission signal generation section 402 to radio resources as commanded by the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding, etc.) of DL signals (including DL data signals, scheduling information, DL control signals, DL reference signals, etc.). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

<Hardware Structure>

Note that the block diagrams that have been used to describe the above embodiment show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically-separate pieces of apparatus (by using cables and/or radio, for example) and using these multiple pieces of apparatus.

Figure 21:
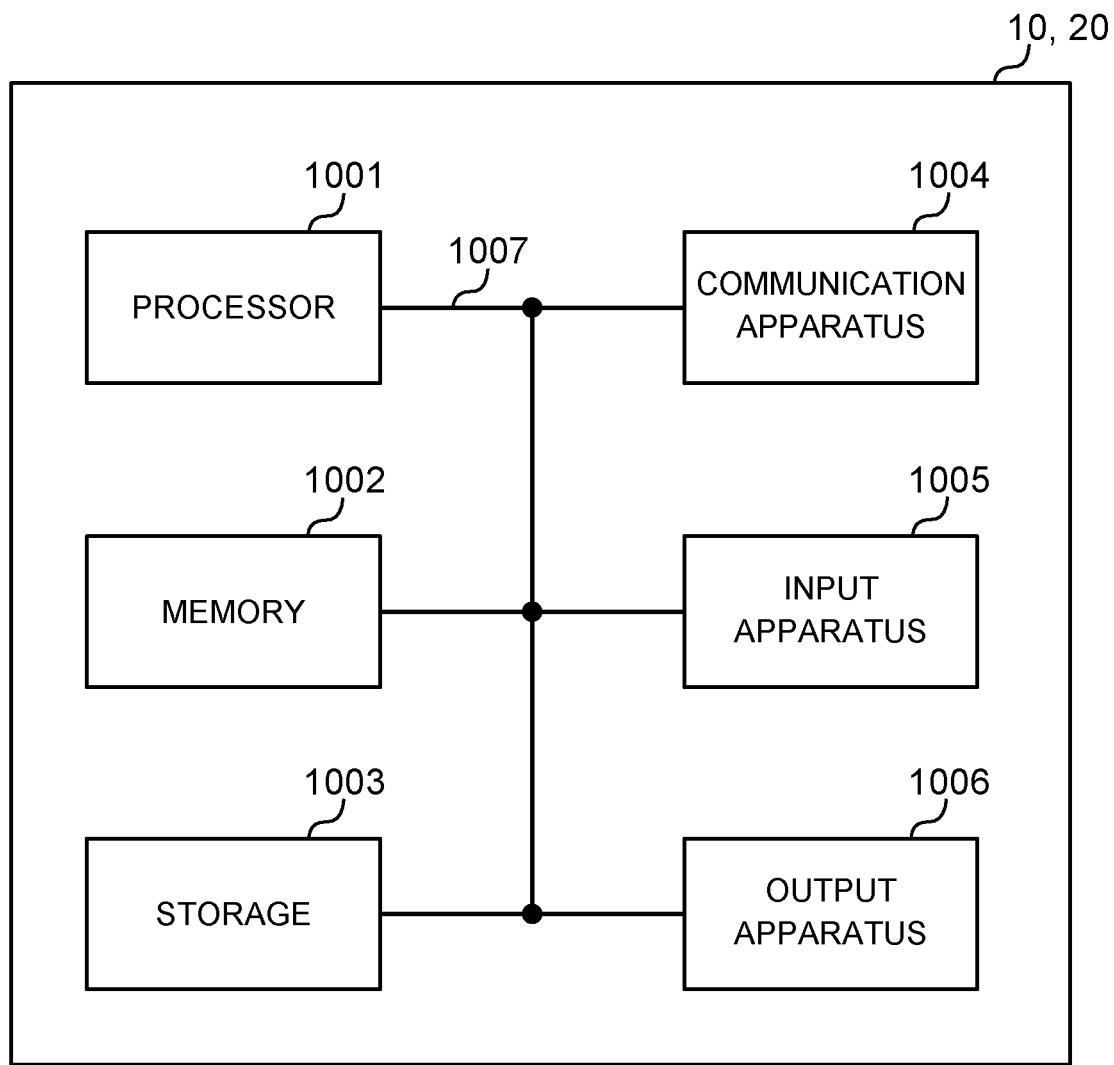
FIG. 21 is a diagram to show an exemplary hardware structure of a radio base station and a user terminal according to the present embodiment.

For example, the radio base station, user terminals and so on according to one embodiment of the present invention may function as a computer that executes the processes of the radio communication method of the present invention. FIG. 21 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006, a bus 1007 and so on.

Note that, in the following description, the term "apparatus" may be replaced by "circuit," "device," "unit" and so on. The hardware structure of a radio base station 10 and a user terminal 20 may be designed to include one or more of each apparatus shown in the drawings, or may be designed not to include part of the apparatus.

For example, although only one processor 1001 is shown, a number of processors may be provided. Furthermore, processes may be implemented with one processor, or processes may be implemented simultaneously or in sequence, or by using different techniques, on one or more processors. Note that the processor 1001 may be implemented with one or more chips.

The functions of the radio base station 10 and the user terminal 20 are implemented by, for example, allowing hardware such as the processor 1001 and the memory 1002 to read given software (programs), and allowing the processor 1001 to do calculations, control communication that involves the communication apparatus 1004, control the reading and/or writing of data in the memory 1002 and the storage 1003, and so on.

The processor 1001 may control the whole computer by, for example, running an operating system. The processor 1001 may be constituted by a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so forth from the storage 1003 and/or the communication apparatus 1004, into the memory 1002, and executes various processes according to these. As for the programs, programs to allow computers to execute at least part of the operations of the above-described embodiment may be used. For example, the control section 401 of a user terminal 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory" (primary storage apparatus), and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) or the like), a digital versatile disc, a Blu-ray (registered trademark) disk, etc.), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using cable and/or wireless networks, and may be referred to as, for example, a "network device," a "network controller," a "network card," a "communication module," and so on. The communication apparatus 1004 may be configured in include a high frequency switch, a duplexer, a filter, a frequency synthesizer and so on, in order to implement, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from outside (for example, a keyboard, a mouse, a microphone, a switch, a button, a sensor and so on). The output apparatus 1006 is an output device for allowing sending output to outside (for example, a display, a speaker, an LED (Light Emitting Diode) lamp, and so on). Note that the input apparatus 1005 and the output apparatus 1006 may be provided in an integrated structure (for example, a touch panel).

Furthermore, these pieces of apparatus, including the processor 1001, the memory 1002 and so on, are connected by the bus 1007, so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by these pieces of hardware. For example, the processor 1001 may be implemented with at least one of these pieces of hardware.

(Variations)

Note that, the terminology used in this specification and the terminology that is needed to understand this specification may be replaced by other terms that communicate the same or similar meanings. For example, a "channel" and/or a "symbol" may be replaced by a "signal" (or "signaling"). Also, a signal may be a message. A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency," and so on.

Furthermore, a radio frame may be comprised of one or more periods (frames) in the time domain. One or more periods (frames) that constitute a radio frame may be each referred to as a "subframe." Furthermore, a subframe may be comprised of one or more slots in the time domain. A subframe may be a fixed time duration (for example, 1 ms), which does not depend on numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a number of minislots. Each minislot may be comprised of one or more symbols in the time domain. Also, a minislot may be referred to as a "subslot."

A radio frame, a subframe, a slot, a minislot, and a symbol all refer to a unit of time in signal communication. A radio frame, a subframe, a slot, a minislot and a symbol may be each called by other applicable names. For example, one subframe may be referred to as a "transmission time interval (TTI)," or a number of contiguous subframes may be referred to as a "TTI," or one slot or mini-slot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent a TTI may be referred to as a "slot," a "minislot" and so on, instead of a "subframe."

Here, a TTI refers to the minimum time unit for scheduling in radio communication, for example. For example, in LTE systems, a radio base station schedules the radio resources (such as the frequency bandwidth and transmission power each user terminal can use) to allocate to each user terminal in TTI units. Note that the definition of TTIs is not limited to this.

A TTI may be the transmission time unit of channel-encoded data packets (transport blocks), code blocks and/or codewords, or may be the unit of processing in scheduling, link adaptation, and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or more slots or one or more minislots) may be the minimum time unit of scheduling. Also, the number of slots (the number of minislots) to constitute this minimum time unit for scheduling may be controlled.

A TTI having a time length of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI" (or a "fractional TTI"), a "shortened subframe," a "short subframe," a "minislot," a "sub-slot," and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a number of contiguous subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair," and so on.

Furthermore, a resource block may be comprised of one or more resource elements (REs). For example, one RE may be a radio resource field of one subcarrier and one symbol.

Note that the structures of radio frames, subframes, slots, minislots, symbols, and so on described above are simply examples. For example, configurations pertaining to the number of subframes included in a radio frame, the number of slots included in a subframe or a radio frame, the number of minislots included in a slot, the number of symbols and RBs included in a slot or a minislot, the number of subcarriers included in an RB, the number of symbols in a TTI, the symbol duration, the length of cyclic prefixes (CPs), and so on can be variously changed.

Also, the information and parameters described in this specification may be represented in absolute values or in relative values with respect to given values, or may be represented using other applicable information. For example, a radio resource may be indicated by a given index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, current determineromagnetic waves, magnetic fields or particles, optical fields or photons, or any combination of these.

Also, information, signals, and so on can be output from higher layers to lower layers, and/or from lower layers to higher layers. Information, signals, and so on may be input and/or output via a number of network nodes.

The information, signals, and so on that are input and/or output may be stored in a specific location (for example, in a memory), or may be managed in a control table. The information, signals, and so on to be input and/or output can be overwritten, updated, or appended. The information, signals, and so on that are output may be deleted. The information, signals, and so on that are input may be transmitted to other pieces of apparatus.

The method of reporting information is by no means limited to those used in the examples/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling, etc.), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as "RRC messages," and can be, for example, an "RRC connection setup message," "RRC connection reconfiguration message," and so on. Also, MAC signaling may be reported using, for example, MAC control elements (MAC CEs (Control Elements)).

Also, reporting of given information (for example, reporting of information to the effect that "X holds") does not necessarily have to be sent explicitly, and can be sent in an implicit way (for example, by not reporting this piece of information, or by reporting another piece of information).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions, and so on.

Also, software, instructions, information and so on may be transmitted and received via communication media. For example, when software is transmitted from a website, a server or other remote sources by using wired technologies (coaxial cables, optical fiber cables, twisted-pair cables, digital subscriber lines (DSL) and so on), and/or wireless technologies (infrared radiation, microwaves, and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," a "NodeB," an "eNodeB (eNB)," an "access point," a "transmission point," a "receiving point," a "transmitting/receiving point," a "femto cell," a "small cell," and so on.

A base station can accommodate one or more (for example, three) cells (also referred to as "sectors"). When a base station accommodates a number of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)," "user terminal," "user equipment (UE)," and "terminal" may be used interchangeably.

A mobile station may be referred to as a "subscriber station," a "mobile unit," a "subscriber unit," a "wireless unit," a "remote unit," a "mobile device," a "wireless device," a "wireless communication device," a "remote device," a "mobile subscriber station," a "access terminal," a "mobile terminal," a "wireless terminal," a "remote terminal," a "handset," a "user agent," a "mobile client," a "client," or some other suitable terms.

A base station and/or a mobile station may be referred to as "transmitting apparatus," "receiving apparatus," and the like.

Furthermore, the radio base stations in this specification may be interpreted as user terminals. For example, each example/embodiment of the present invention may be applied to a configuration in which communication between a radio base station and a user terminal is replaced with communication among a number of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways), and so on may be possible, but these are not limiting) other than base stations, or combinations of these.

The examples/embodiments illustrated in this specification may be used individually or in combinations, which may be switched depending on the mode of implementation. Also, the order of processes, sequences, flowcharts, and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), other adequate radio communication methods, and/or next-generation systems that are enhanced based on these.

The phrase "based on" as used in this specification does not mean "based only on" unless otherwise specified. In other words, the phrase "based on" means both "based only on" and "based at least on."

Reference to elements with designations such as "first," "second," and so on as used herein does not generally limit the number/quantity or order of these elements. These designations are used herein only for convenience, as a method for distinguishing between two or more elements. It follows that reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database, or some other data structure), ascertaining, and so on. Furthermore, to "judge" and "determine" as used in the present disclosure may be interpreted as meaning making judgements and determinations related to receiving (for example, receiving information), transmitting (for example, transmitting information), inputting, outputting, accessing (for example, accessing data in a memory) and so on. In addition, to "judge" and "determine" as used in the present disclosure may be interpreted as meaning making judgements and determinations related to resolving, selecting, choosing, establishing, comparing, and so on. In other words, to "judge" and "determine" as used in the present disclosure may be interpreted as meaning making judgements and determinations with regard to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be interpreted as "access."

As used herein, when two elements are connected, these elements may be considered "connected" or "coupled" to each other by using one or more electrical wires, cables, and/or printed electrical connections, and, as a number of non-limiting and non-inclusive examples, by using electromagnetic energy having wavelengths of the radio frequency region, the microwave region and/or the optical region (both visible and invisible).

In the present specification, the phrase "A and B are different" may mean "A and B are different from each other." The terms such as "leave," "coupled" and the like may be interpreted likewise.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various variations, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a receiver that receives a contention resolution message in a random access procedure; and
a processor that controls to transmit a Hybrid Automatic Repeat reQuest-Acknowledge (HARQ-ACK) in response to the contention resolution message by using a PUCCH in an initial active Uplink Bandwidth Part (UL BWP),
wherein the processor determines a Physical Resource Block (PRB) index of the PUCCH in a first hop and a PRB index of the PUCCH in a second hop, based on a size of the initial active UL BWP.

2. The terminal according to claim 1, wherein the processor assumes that a pair of the PRB index in the first hop and the PRB index in the second hop is defined differently for each PUCCH format.

3. The terminal according to claim 2, wherein the processor determines the PRB index in the first hop and the PRB index in the second hop, based on a value that is selected from one or more candidate values based on a field value in broadcast information.

4. The terminal according to claim 1, wherein the size of the initial active UL BWP is a number of PRBs of the initial active UL BWP.

5. A radio communication method for a terminal, comprising:
receiving a contention resolution message in a random access procedure; and
controlling to transmit a Hybrid Automatic Repeat reQuest-Acknowledge (HARQ-ACK) in response to the contention resolution message by using a PUCCH in an initial active Uplink Bandwidth Part (UL BWP),
wherein the terminal determines a Physical Resource Block (PRB) index of the PUCCH in a first hop and a PRB index of the PUCCH in a second hop, based on a size of the initial active UL BWP.

6. A base station comprising:
a transmitter that transmits a contention resolution message in a random access procedure; and
a processor that controls to receive a Hybrid Automatic Repeat reQuest-Acknowledge (HARQ-ACK) in response to the contention resolution message by using a PUCCH in an initial active Uplink Bandwidth Part (UL BWP),
wherein the processor determines a Physical Resource Block (PRB) index of the PUCCH in a first hop and a PRB index of the PUCCH in a second hop, based on a size of the initial active UL BWP.

7. A radio communication system comprising a base station and a terminal, wherein:
the base station comprises:
a transmitter that transmits a contention resolution message in a random access procedure; and
a first processor that controls to receive a Hybrid Automatic Repeat reQuest-Acknowledge (HARQ-ACK) in response to the contention resolution message by using a PUCCH in an initial active Uplink Bandwidth Part (UL BWP), and
the terminal comprises:
a receiver that receives the contention resolution message in the random access procedure; and
a second processor that controls to transmit the HARQ-ACK in response to the contention resolution message by using the PUCCH in the initial active UL BWP,
wherein the second processor determines a Physical Resource Block (PRB) index of the PUCCH in a first hop and a PRB index of the PUCCH in a second hop, based on a size of the initial active UL BWP.

* * * * *